(12) United States Patent
Zhang et al.

(10) Patent No.: US 8,521,173 B2
(45) Date of Patent: Aug. 27, 2013

(54) METHODS AND SYSTEMS FOR DYNAMIC AND CONFIGURATION BASED FRACTIONAL FREQUENCY REUSE FOR UNEVEN LOAD DISTRIBUTIONS

(75) Inventors: Honghai Zhang, Ewing, NJ (US); Narayan Prasad, Monmouth Junction, NJ (US); Sampath Rangarajan, Bridgewater, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 531 days.

(21) Appl. No.: 12/722,761

(22) Filed: Mar. 12, 2010

(65) Prior Publication Data

US 2011/0070911 A1    Mar. 24, 2011

Related U.S. Application Data

(60) Provisional application No. 61/183,758, filed on Jun. 3, 2009, provisional application No. 61/185,767, filed on Jun. 10, 2009.

(51) Int. Cl.
*H04W 40/00*      (2009.01)

(52) U.S. Cl.
USPC ........ 455/447; 455/448; 455/450; 455/452.1; 455/453

(58) Field of Classification Search
USPC ................ 455/446, 448, 450, 452.1, 452.2, 455/453, 447
See application file for complete search history.

(56) References Cited

U.S. PATENT DOCUMENTS

| | | | |
|---|---|---|---|
| 6,262,980 B1 * | 7/2001 | Leung et al. | 370/336 |
| 7,257,406 B2 * | 8/2007 | Ji | 455/450 |
| 2005/0096061 A1 * | 5/2005 | Ji et al. | 455/450 |
| 2009/0061778 A1 * | 3/2009 | Vrzic et al. | 455/62 |
| 2010/0027502 A1 * | 2/2010 | Chen et al. | 370/330 |

OTHER PUBLICATIONS

Das, S., et al. "Interference Mitigation Through Interference Avoidance" Fortieth Asilomar Conference on Signals, Systems and Computers. Oct.-Nov. 2006. pp. 1815-1819.
IEEE Computer Society. "Draft Amendment to IEEE Standard for Local and Metropolitan Area Networks—Part 16: Air Interface for Broadband Wireless Access Systems—Advanced Air Interface" IEEE P802.16m/D1. Jul. 2009. (514 Pages).
Stolyar, A., et al. "Self-Organizing Dynamic Fractional Frequency Reuse for Best-Effort Traffic Through Distributed Inter-Cell Coordination" IEEE Infocom 2009. Apr. 2009. pp. 1287-1295.
Zhang, H., et al. "Distributed Inter-Cell Interference Mitigation in OFDMA Wireless Data Networks" 4th IEEE Broadband Wireless Access Workshop—Technical Program. Nov. 2008. pp. 1-5.

* cited by examiner

*Primary Examiner* — Temica M Beamer
(74) *Attorney, Agent, or Firm* — Joseph Kolodka

(57) ABSTRACT

Fractional frequency reuse systems and methods for assigning physical resource units of an available frequency band to sectors of cells are disclosed. In particular, the systems and methods permit adaptation of frequency configuration partitions to mobile station or throughput distribution within cells while at the same time ensuring mitigation of interference between neighboring sectors of different cells.

9 Claims, 10 Drawing Sheets

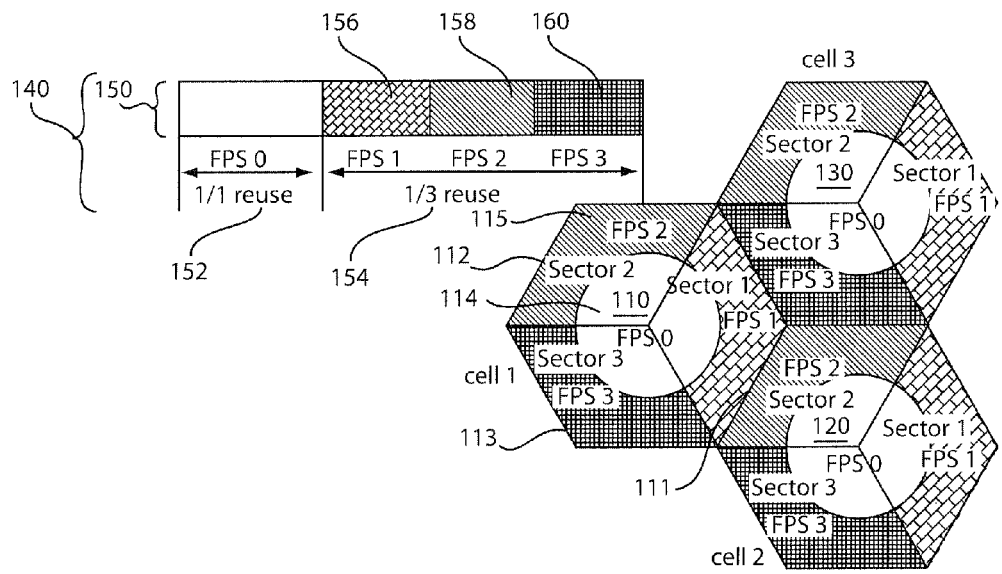
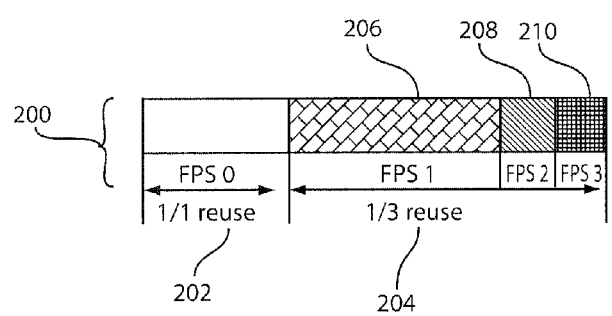
FIG. 1
FIG. 2

METHODS AND SYSTEMS FOR DYNAMIC AND CONFIGURATION BASED FRACTIONAL FREQUENCY REUSE FOR UNEVEN LOAD DISTRIBUTIONS

RELATED APPLICATION INFORMATION

This application claims priority to provisional application Ser. No. 61/183,758 filed on Jun. 3, 2009 and to provisional application Ser. No. 61/185,767 filed on Jun. 10, 2009, both of which are incorporated herein by reference.

BACKGROUND

1. Technical Field

The present invention relates to fractional frequency reuse methods and systems, and more particularly to dynamic and configuration based fractional frequency reuse methods and systems.

2. Description of the Related Art

In general, the concept of fractional frequency reuse (FFR) entails allocating all available partitions of a frequency band to service wireless users near the center of a cell while restricting transmission to users near the edges of a cell to only a fraction of the available band. FFR configurations alleviate interference experienced by users of neighboring sectors of different cells. Various methods for assigning frequency partitions within an FFR framework have been developed.

One such method assigns each sector of a cell with a priority on a set of frequency partitions. Here, partitions to which a sector holds a higher priority are utilized for data transmission in the sector and, over time, data transmission in the sector is gradually expanded to frequency partitions to which the sector holds lower priorities. In other methods, arbitrary physical resource unit assignment is permitted and instantaneous channel gain is assumed for the utility computations. In addition, FFR schemes have been proposed in which the transmission power on each frequency partition is dynamically adjusted. However, arbitrary transmission power on each frequency partition is permitted. In these methods, complicated derivative computation is employed.

SUMMARY

In accordance with exemplary embodiments of the present invention, physical resource units of an available frequency subband can be allocated to cell sectors based on user-distribution and throughput while mitigating interference effects of neighboring sectors. In particular, exemplary configuration-based fractional frequency reuse methods and systems permit base stations of different cells to select different resource unit partition configurations to maximize throughput and, at the same time, ensure partial alignment of partition boundaries to reduce interference between transmissions in the different cells. Further, other exemplary fractional frequency reuse methods and systems dynamically allocate physical resource units to sectors of cells based on user-utility measures to maximize throughput in accordance with predetermined adjustment increments and constraints and similarly can ensure partial alignment of partition boundaries between sectors of neighboring cells.

One exemplary implementation of the present invention is directed to a fractional frequency reuse method for assigning physical resource units of a contiguous frequency sub-band to a given sector of a cell including one or more base stations. The method may begin by allocating an initial contiguous, native set of the physical resource units dedicated for transmission of data to users in the given sector. In addition, an indication of a utility change due to adjustment of the size of the native set for each increment of a pre-determined set of increments can be received from at least one base station in each out-neighbor sector. Here, an out-neighbor sector is a sector that is subjected to interference from the given sector that exceeds an interference threshold. Thereafter, a total utility change for each of the increments can be computed based on utility changes of the out-neighbor sectors. Further, one of the increments may be selected for adjusting the size of the native set based on the total utility change. After selecting an appropriate increment to adjust the native set of physical resource units, data may be transmitted to the users in the given sector on the native set of the physical resource units adjusted in accordance with the selected increment.

An alternative exemplary implementation of the present invention is drawn towards a fractional frequency reuse method for assigning physical resource units of a contiguous frequency subband to sectors of cells, with each cell including one or more base stations. The frequency subband can be segmented for each cell such that each separate segment includes a first contiguous portion of physical resource units dedicated to all sectors of the cell in vicinities of the center of the cell and a second contiguous portion of physical resource units dedicated for use in only one of the sectors in the cell in an outer area of the cell. In addition, each cell may be assigned with a physical resource unit configuration such that the second contiguous portion of physical resource units of a sector of a given cell partially overlaps with the first contiguous portion of physical resource units in a segment including the second contiguous portion dedicated to the same sector of a cell neighboring the given cell. Thereafter, data may be transmitted to the users in the sectors in accordance with the assigned physical resource unit configurations.

Another exemplary implementation of the present invention is directed to a fractional frequency reuse system for assigning physical resource units of a contiguous frequency subband to sectors of cells comprising a plurality of base stations disposed in neighboring cells. The base stations may be configured to transmit data to users in a given cell such that in each separate segment of the contiguous frequency subband, a first contiguous portion of physical resource units in the segment is used for data transmission in all sectors of the given cell in vicinities of the center of the given cell and a second contiguous portion of physical resource units in the segment is used for data transmission in only one of the sectors in the given cell in an outer area of the given cell. The second contiguous portion of physical resource units of a sector of the given cell can partially overlap with the first contiguous portion of physical resource units in a segment including the second contiguous portion dedicated to the same sector of a cell neighboring the given cell.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 1 is a high level diagram illustrating fractional frequency reuse of an available frequency band between sectors of neighboring cells.

FIG. 2 is a high-level block diagram illustrating an exemplary frequency partition configuration that addresses an unbalanced load of mobile stations.

DETAILED DESCRIPTION OF PREFERRED EMBODIMENTS

Figure 3:
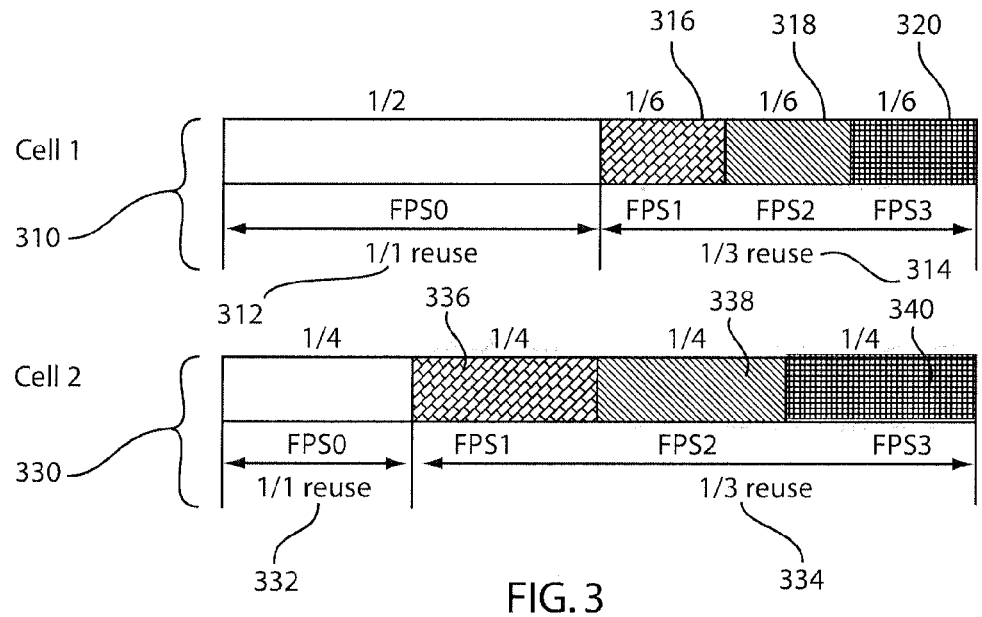
FIG. 3 is a high-level block diagram illustrating an exemplary naïve frequency partition configuration selected to address an un-balanced load of mobile stations.

As noted above, generally, the concept of fractional frequency reuse (FFR) entails allocating all available partitions of a frequency band for areas near the center of a cell while restricting transmission in areas near the edges of a cell to only a fraction of the available frequency band. In particular, in an FFR scheme, different frequency reuse factors on different frequency partitions are permitted. For example, referring to the drawings in which like numerals represent the same or similar elements and initially to FIG. 1, in a typical FFR system, the available frequency band 150 is divided into two types of partitions: 1/1-reuse partitions 152 and 1/3-reuse partitions 154. As shown in FIG. 1, each neighboring cell, cell 1 (110), cell 2 (120), and cell 3 (130), includes three different sectors, sector 1 (111), sector 2 (112) and sector 3 (113), which are configured and oriented in the same manner for each cell. Here, each sector may have its own base station such that three base stations are situated at or near the center of a given cell. Further, each base station (BS) or sector is allocated with a 1/1-reuse partition and ⅓ of the 1/3-reuse partitions. For example, each sector of any given cell shares the 1/1 reuse partition 152 while sectors 1 (111), 2 (112) and 3 (113) are allocated frequency partition (FP) 1, FP 2, FP 3 with corresponding frequency partition size (FPS) 1 (156), FPS 2 (158) and FPS 3 (160), respectively. In addition, each sector is divided into interior region 114 and cell-edge region 115. Users in the interior region are assigned the 1/1-reuse partition and the users in the cell edge region are assigned one of the 1/3-reuse partitions. An advantage of FFR is that with 1/3 reuse in accordance with the scheme illustrated in FIG. 1, cell edge users contend with less interference and interior users have an improved frequency efficiency when compared to systems in which each cell employs the entire available frequency band 152 throughout its total area.

Further, in a typical FFR system, the 1/1-reuse partition occupies a fraction $(1-\rho)$ $(0<\rho<1)$ of the total bandwidth (subbands) and the 1/3-reuse frequency region is equally divided into three partitions, each occupying $\rho/3$ of the total bandwidth (subbands). To fully exploit interference mitigation, the boundaries of all partitions of the same sectors of neighboring cells should be aligned and the FFR parameter $\rho$ should be fixed across the whole network, as shown in FIG. 1, where each cell employs the same frequency partition configuration 140. However, this configuration may impose severe disadvantages for both intra-cell and inter-cell unbalanced user and traffic distributions.

For example, to address an intra-cell unbalanced load, the three cell system provide in FIG. 1 is considered. If the majority of the traffic is at the interior region 114 of a given cell, system efficiency would be improved if a very small value of $\rho$ is selected and most of the available subbands are assigned to the 1/1-reuse partition. Alternatively, if the majority of the user-traffic is at the cell-edge 115, system efficiency would be improved in the given cell if $\rho$ is set to a value close to 1.

With reference to FIG. 2 with continuing reference to FIG. 1, an exemplary means for addressing an inter-cell unbalanced load is considered. Referring again to the three-cell system of FIG. 1, inter-cell interference may occur at the intersection area of the three cells, namely at sector 1 of cell 1, sector 2 of cell 2 and sector 3 of cell 3. If sector 1 of cell 1 services many users while sector 2 of cell 2 and sector 3 of cell 3 service relatively few users, system efficiency may improve if the bandwidth in the 1/3-reuse region is un-evenly partitioned. For example, in the frequency partition configuration of FIG. 2, the 1/1 reuse partition 202 can remain the same as the 1/1 reuse partition 152 of FIG. 1. However, here, the 1/3 reuse partition can be unevenly divided where the FPS 1 206 for sector 1 in the cells occupies most of the available bandwidth. In contrast, the sizes of FPS 2 (208) of sector 2 and FPS 3 (210) of sector 3 of the cells can be reduced.

Unbalanced load is a common occurrence, as, generally, user and traffic distribution is not uniform across cells of a wireless network. For example, in an area with many apartments, a relatively high traffic load is very likely, whereas a forest area is likely to have a low traffic load. Additionally, areas in which a sport stadium is disposed may sustain dynamic traffic loads, depending on whether a sporting event is held on any given day. Moreover, such un-even traffic distribution is also location-specific. Thus, both the ratio ρ and the partition boundaries of the available frequency band should be cell-dependent.

However, naively selecting the ratio ρ and the partition boundary may pose several unintended problems. For example, referring to FIG. 3 with continuing reference to FIG. 1, frequency partition configurations 310 and 330 incorporating naïve selections of ρ based on user-distribution patterns for neighboring cells 1 & 2 of FIG. 1 are illustrated. Here, frequency partition configuration 310 has a ρ value of ½, where the 1/1 reuse partition 312 for FPS 0 of cell 1 occupies half of the available frequency band and FPS 1-3 (316-320) of the 1/3 reuse partition 314 of cell 1 each occupy ⅙ of the available frequency band. In turn, frequency partition configuration 330 of neighboring cell 2 has a ρ value of ¾, where the 1/1 reuse partition 332 for FPS 0 of cell 2 and FPS 1-3 (336-340) of the 1/3 reuse partition 334 of cell 2 each occupy a quarter of the available frequency band. In the frequency allocation illustrated in FIG. 3, FPS 1 (316) of cell 1 is completely contained within FPS 2 (338) of cell 2. Therefore, cell edge users in sector 1 of cell 1 of FIG. 1 will receive strong interference from neighboring sector 2 of cell 2.

Accordingly, to mitigate interference between neighboring sectors while, at the same time, permitting the use of different frequency partition configurations between neighboring sectors that are based on user-distribution and throughput patterns, exemplary embodiments of the present invention can employ frequency partition configurations that ensure partial alignment of partition boundaries. Moreover, exemplary embodiments of the present invention may dynamically adjust the sizes and boundaries of partitions based on user-utility functions in a way that avoids interference.

Figure 4:
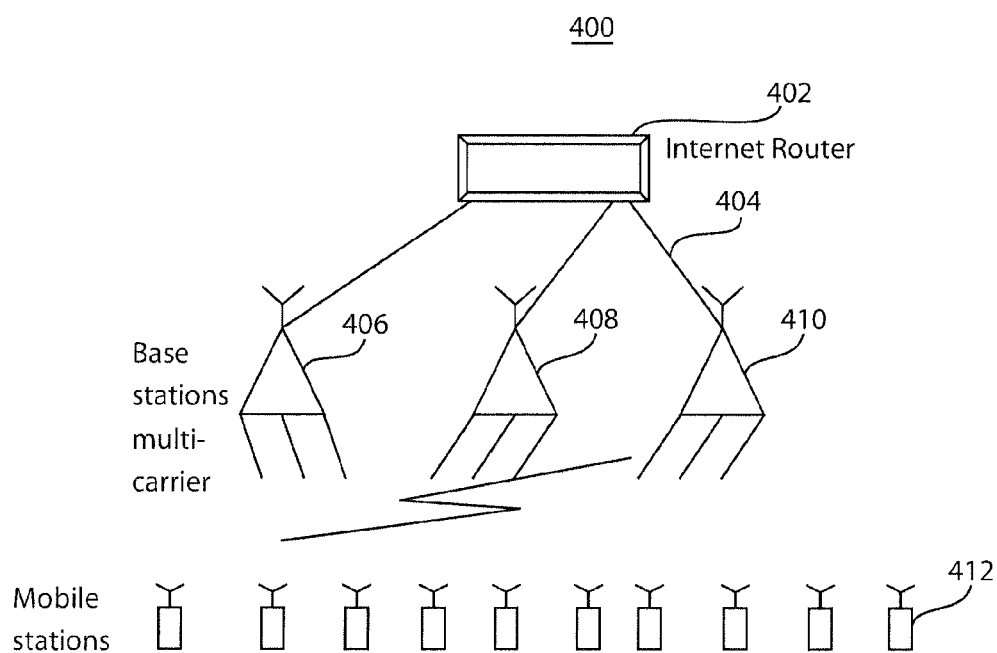
FIG. 4 is a high level block diagram of an exemplary system in which exemplary fractional frequency reuse embodiments of the present invention can be implemented.

With reference now to FIG. 4, an exemplary system 400 in which exemplary fractional frequency reuse method embodiments of the present invention may be implemented is illustrated. System 400 may include a wired network 404 connecting a series of base stations, such as base stations 406-410, servicing mobile stations or users 412 in a cellular network. The wired network may include interne routers 402 beyond which one or more control units (not shown) of a service provider may be disposed to forward and receive information to and from the mobile stations 412 via base stations 406-410. In particular, the base stations 406-410 can service users on multiple physical resource units (PRUs), which are the basic physical unit for resource allocation. For example, a PRU may comprise a certain number of consecutive subcarriers by a certain number of consecutive orthogonal frequency-division multiple access (OFDMA) symbols. Here, each base station may be allotted the responsibility of scheduling and performing interference mitigation in its corresponding sector.

Figure 5:
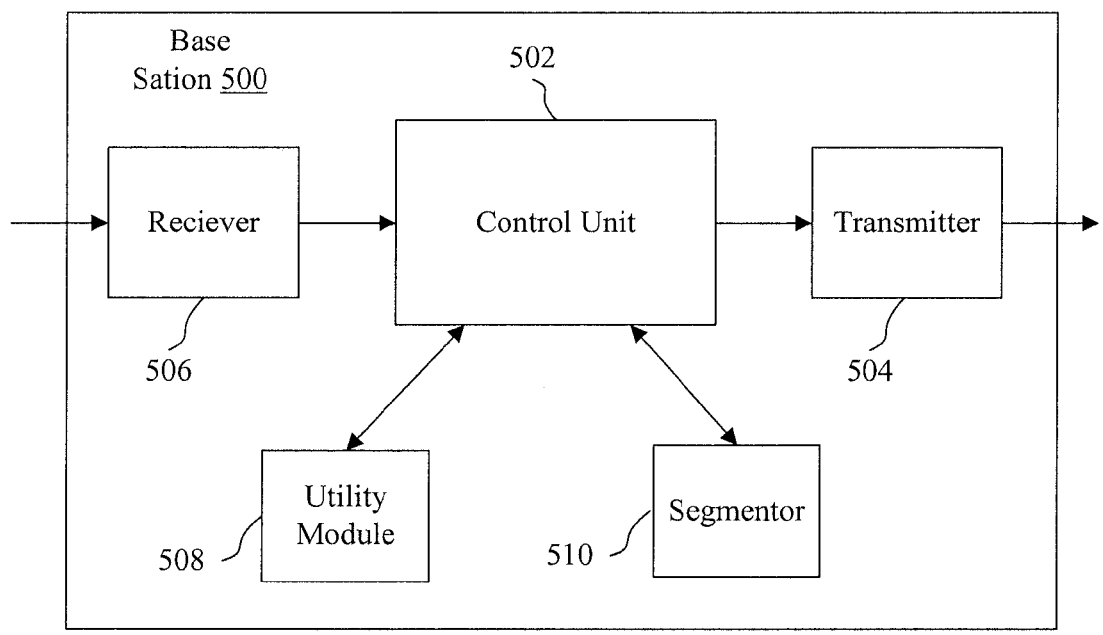
FIG. 5 is a high level block/flow diagram of an exemplary base station system for implementation of exemplary dynamic and/or exemplary configuration based fractional frequency reuse embodiments of the present invention.

Referring to FIG. 5, with continuing reference to FIG. 4, an exemplary base station system 500 is illustrated. The base station system 500 may be implemented in any one or more of the base stations of system 400. Base station system 500 may include a control unit 502, a transmitter 504, a receiver 506, a utility module 508 and a segmentor 510. For the sake of brevity, the functions of the various elements are described in more detail below with respect to exemplary method embodiments.

It should be understood that embodiments described herein may be entirely hardware or including both hardware and software elements. In preferred embodiments, system elements of the present invention described with respect to FIGS. 4 and 5, such as the control unit, the segmentor and the utility module, are implemented in hardware or hardware and software, which includes but is not limited to firmware, resident software, microcode, etc.

Embodiments may include a computer program product accessible from a computer-usable or computer-readable storage medium providing program code for use by or in connection with a computer or any instruction execution system. A computer-usable or computer readable storage medium may include any apparatus that stores the program for use by or in connection with the instruction execution system, apparatus, or device. The medium can be magnetic, optical, electronic, electromagnetic, infrared, or semiconductor system (or apparatus or device). The medium may include a computer-readable medium such as a semiconductor or solid state memory, magnetic tape, a removable computer diskette, a random access memory (RAM), a read-only memory (ROM), a rigid magnetic disk and an optical disk, etc.

As mentioned above, exemplary implementations of the present invention may include configuration-based method embodiments and dynamic method embodiments. In exemplary configuration-based method embodiments, base stations of sectors that are near each other are permitted to select different frequency partition configurations to support uneven load distributions and service users within corresponding sectors. In particular, the base stations may carefully define the location of subband frequency partitions to maintain partial alignment of partitions when two nearby sectors use different partition configurations. Optionally, each base station may generate a subset of PRUs on which the base station does not transmit. The subset of PRUs is termed herein as a 0/1-reuse sub-partition.

Figure 6:
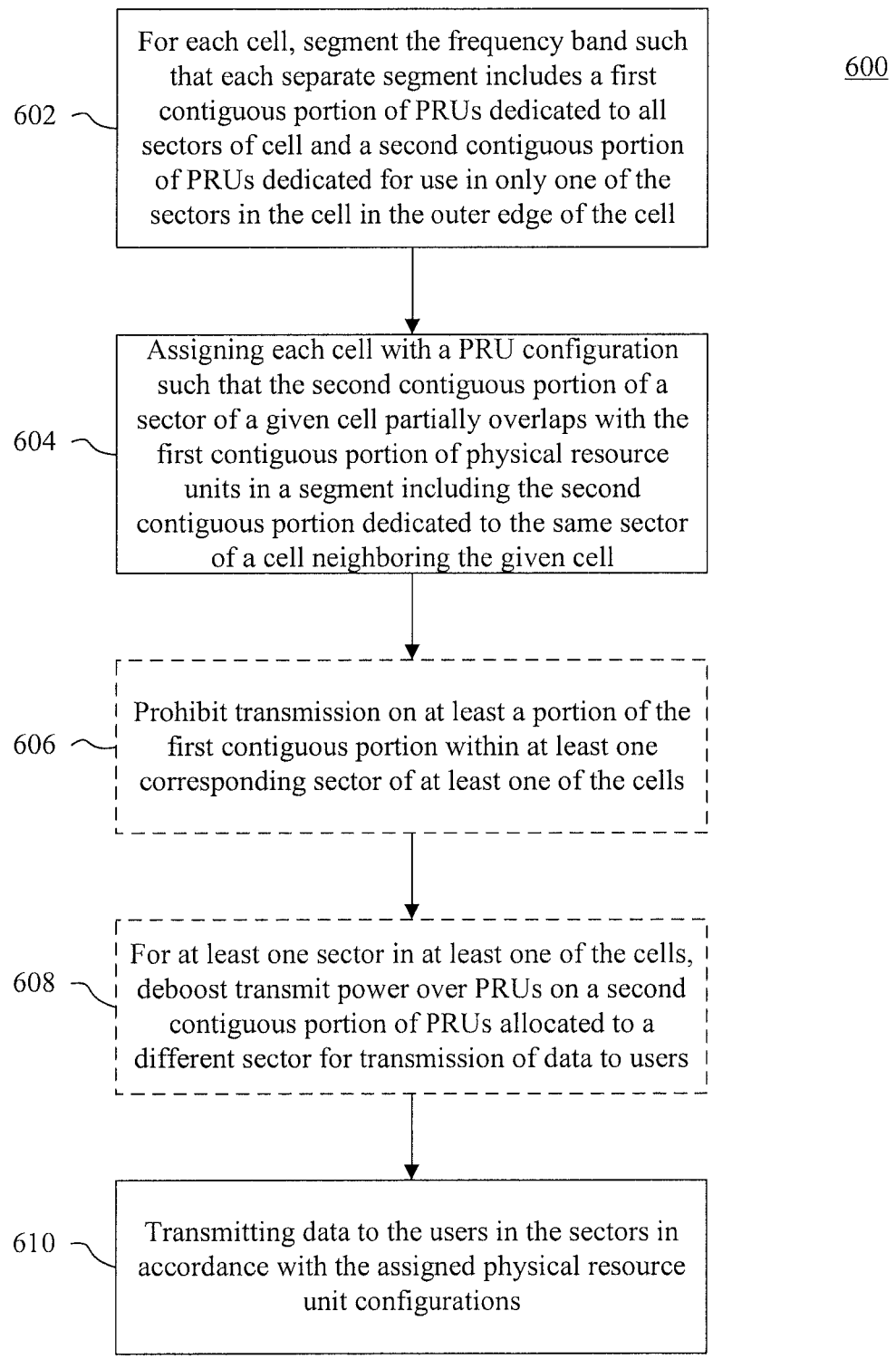
FIG. 6 is a high level block/flow diagram of an exemplary configuration-based fractional frequency reuse method for assigning physical resource units of a contiguous frequency band to sectors of cells for transmission of data to users in the sectors in accordance with exemplary embodiments of the present invention.
Figure 7:
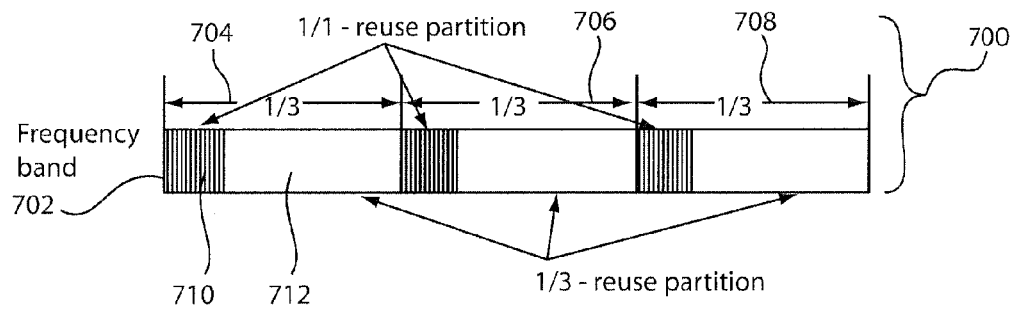
FIG. 7 is a high level diagram of an exemplary frequency partition configuration in accordance with exemplary configuration-based fractional frequency reuse embodiments of the present invention.
Figure 8:
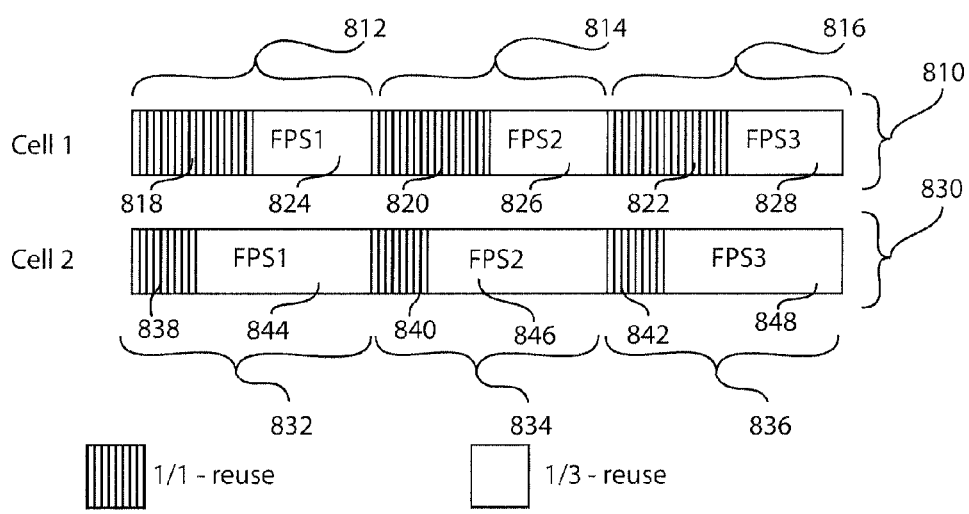
FIG. 8 is a high level diagram of exemplary frequency partition configurations of neighboring cells in accordance with exemplary configuration-based fractional frequency reuse embodiments of the present invention.

Referring now to FIGS. 6-8, with continuing reference to FIGS. 1, 4 and 5, a configuration-based FFR method 600 for assigning physical resource units of a contiguous frequency band to sectors of cells for transmission of data to users in the sectors in accordance with exemplary embodiments of the present invention is illustrated. It should be noted that method 600 can be implemented by each base station in each cell of a cellular network. Further, the method implementations in the base stations may be coordinated by a master control unit at a service provider connected to wired network 404.

Method 600 may begin at step 602 in which the segmentor 510, under the control of the control unit 502 of base station 500, may segment the frequency band such that each separate segment includes a first contiguous portion of physical resource units dedicated to all sectors of the cell in vicinities of the center of the cell and a second contiguous portion of physical resource units dedicated for use in only one of the sectors in the cell in an outer area of the cell. For example, one exemplary frequency partition configuration 700 that may be generated at step 602 is provided in FIG. 7. As shown in FIG. 7, the frequency band 702 may be segmented into three segments, 704, 706, 708, each of which includes a first contiguous portion 710 of PRUs dedicated to all sectors of the cell in vicinities of the center of the cell and a second contiguous portion 712 of PRUs dedicated for use in only one of the sectors in the cell in an outer area of the cell. For example, portions 710 may correspond to a 1/1 reuse partition, discussed above, and portions 712 may correspond to 1/3 use partitions, also discussed above. In the particular example of FIG. 7, the frequency subbands are divided into three groups of contiguous PRUs. An equal number of PRUs at the beginning of each segment is allocated as a 1/1-reuse partition and the remaining PRUs in each segment comprise a 1/3-reuse partition. Of course, it is also possible to interchange the locations of the 1/1-reuse and 1/3-reuse partitions. In exemplary embodiments of the present invention, the frequency configuration 700 may be an initial configuration that is subsequently altered at step 604 in accordance with user-distribution and/or throughput patterns, as discussed above.

In order to minimize the interference of neighboring cells and neighboring sectors while permitting different partition configurations in different sectors, the partition boundaries in different sectors are kept in alignment with each other. Thus, at step 604, the control unit 502 of various base stations can be employed to assign each cell with a physical resource unit configuration such that the second contiguous portion of physical resource units of a sector of a given cell partially overlaps with the first contiguous portion of physical resource units in a segment including the second contiguous portion dedicated to the same sector of a cell neighboring the given cell. For example, FIG. 8 illustrates two frequency partition configurations 810 and 830 of the same available frequency band for neighboring cells 1 and 2 of FIG. 1, respectively. As shown in FIG. 8, the available frequency band for cell 1 is segmented into segments 812, 814, and 816, which respectively include first contiguous portions 818-822 dedicated to a 1/1 re-use partition and second contiguous portions 824-828 respectfully allocated to FPS 1, FPS 2 and FPS 3 for sectors 1, 2 and 3, respectively, as 1/3 re-use partitions of cell 1. In turn, the available frequency band for cell 2 is segmented into segments 832, 834, and 836, which respectively include first contiguous portions 838-842 dedicated to a 1/1 reuse partition and second contiguous portions 844-848 respectfully allocated to FPS 1, FPS 2 and FPS 3 for sectors 1, 2 and 3, respectfully, as 1/3 re-use partitions of cell 2.

As noted above, the sizes of the first and second contiguous portions of physical resource units of any given cell can be assigned based on user-distribution and/or user-throughput within the given cell. In the example of FIG. 8, the 1/1-reuse partition of cell 1 occupies half of the available PRUs, corresponding to a ρ value of ½, while the 1/1-reuse partition of cell 2 only occupies a quarter of the PRUs, corresponding to a ρ value of ¾. Further, the control unit 502 at step 604 may be configured to ensure that the second portion of a segment of a sector of a given cell partially overlaps with a first portion of a segment including a second portion that is allocated to the same sector of a different cell to avert interference between neighboring sectors of different cells. For example, as shown in FIG. 8, control units 502 of base stations in the cells construct the frequency partitions such that the 1/3-reuse partition in cell 2 partially overlaps with the 1/1-reuse partition in cell 1. For example, second contiguous portion 844 for sector 1 of cell 2 partially overlaps with the first contiguous portion 818 of a segment 812 including a second contiguous portion 824 that is allocated to the same sector, sector 1, of cell 1. Similarly, second contiguous portions 846 and 848 of sectors 2 and 3, respectively, of cell 2 partially overlap with first contiguous portions 820 and 822 in respective segments 814 and 816 including second contiguous portions 826 and 828, respectfully, of the same sectors of cell 1. However, to ensure interference mitigation, there is no frequency overlap for two adjacent sectors that use two different 1/3-partitions.

For example, FPS 1 of sector 1 in cell 1 does not use the any PRU that is included in FPS 2 of neighboring sector 2 of cell 2 or FPS 3 of sector 3 in cell 2.

It should be noted that, as illustrated in FIG. 8, each first contiguous portion of at least one of the cells has the same number of physical resource units. For example, each first contiguous portion 818, 820 and 822 of cell 1 can have the same number of PRUs. Similarly, first contiguous portions 838, 840 and 842 also have the same number of PRUs. In addition, each second contiguous portion of at least one of the cells has the same number of physical resource units. For example, second contiguous portions 824, 826 and 828 of cell 1 have the same number of PRUs. Moreover, second contiguous portions 844, 846 and 848 of cell 2 also have the same number of PRUs. Additionally, each segment of a cell, such as segments 812, 814 and 816, may have an equal number of physical resource units. Thus, the segments of each cell may be of uniform size. Furthermore, each segment of an available frequency band can occupy a mutually exclusive portion of the available frequency band, as shown in FIG. 8. Similarly, each portion 818-828 of the available frequency band occupies mutually exclusive sets of PRUs along the available band.

Further, at least one boundary of a contiguous portion dedicated to a sector of a given cell can be aligned with a corresponding contiguous portion dedicated to the same sector of the cell neighboring the given cell. For example, in FIG. 8, the left boundary of contiguous portion 818 of sector 1 of cell 1 is aligned with the left boundary of a corresponding contiguous portion 838 of the same sector, sector 1, of neighboring cell 2. In turn, the right boundary of contiguous portion 824 of sector 1 of cell 1 is aligned with the right boundary of a corresponding contiguous portion 844 of the same sector, sector 1, of neighboring cell 2. Additionally, as shown in the example of FIG. 8, only one boundary in corresponding contiguous portions, for example the left boundary of contiguous portions 818 and 838 and the right boundary of contiguous portions 824 and 844, can be aligned, where the other boundary of the corresponding contiguous portions, for example the right boundaries of contiguous portions 818 and 838 and the left boundaries of contiguous portions 824 and 844, can be varied or adjusted in accordance with user or mobile station distribution.

Optionally, at step 606, the control unit 502 can prohibit transmission on at least a portion of the first contiguous portion within at least one corresponding sector of at least one of the cells. For example, the control unit 502 may introduce a 0/1-reuse sub-partition within the 1/1-reuse partition. As noted above, a base station does not transmit on the PRUs in the 0/1-reuse sub-partition. The purpose of creating the 0/1-reuse sub-partition is to reduce interference to neighboring sectors. The 0/1-reuse area is considered here as part of the 1/1-reuse partition. In addition, its size and locations can be specified separately to be compatible with traditional FFR schemes with no such sub-partitions. Two extra bits may be used to specify the size of the 0/1-reuse sub-partition within the 1/1-reuse partition. For example, when these two bits are 00, the frequency partition configuration can fall back to the original FFR without the 0/1-reuse sub-partition. Tables 1B, 2B, and 3B, shown and discussed in further detail below, illustrate an example of coding and size specifications of the 0/1-reuse sub-partition in the 1/1-reuse partitions.

Figure 9:
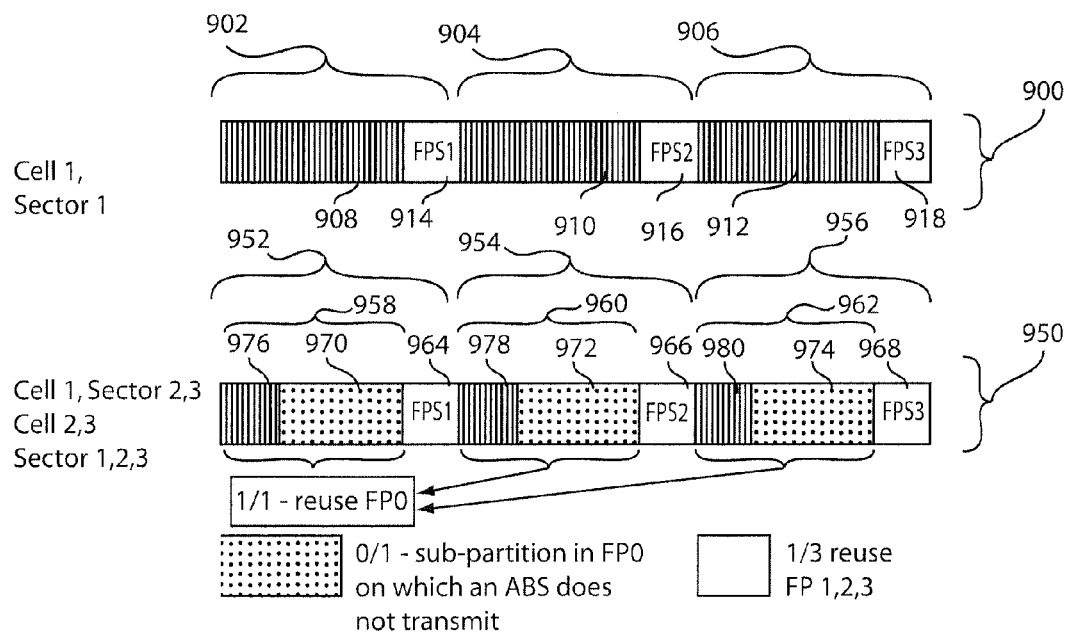
FIG. 9 is a high level diagram illustrating the application of a 0/1 reuse sub-partition in sectors of neighboring cells in accordance with one exemplary embodiment of the present invention.

Referring now to FIG. 9, frequency partition configurations 900 and 950 are provided, illustrating the utilization of 0/1-reuse sub-partitions to address un-even load distributions. Here, it may be assumed that there are many more users in one sector than those in neighboring sectors. In particular, using FIG. 1 as an example, it can be assumed that most of the users are in sector 1 of cell 1. Frequency configuration 900 is applied to sector 1 of cell 1, where 1/1 re-use partitions occupy first continuous portions 908-912 of segments 902-906, respectively, of cell 1. In addition, second portions 914-918 (FPS 1-3) of segments 902-906 are allocated for use by sectors 1-3 of cell 1, respectively. Accordingly, from the perspective of a base station in sector 1 of cell 1, in areas of the interior region FPS 0 of cell 1, the entire available band can be employed by base stations in all sectors. Further, in the cell-edge regions, partitions 914-918 are exclusively employed by base stations in sectors 1, 2 and 3 of cell 1, respectively.

In turn, frequency configuration 950 is applied by base stations in sectors 2 and 3 of cell 1 and sectors 1-3 of cell 2. As shown in FIG. 9, segments 952-956 correspond to segments 902-906 of frequency configuration 900. Further, the first contiguous portions 958-962 of segments 952-956 of configuration 950 each include respective portions 970-974 of 0/1 reuse partitions on which base stations in sectors 2 and 3 of cell 1 and sectors 1-3 of cell 2 are prevented from transmitting. Thus, from the perspective of any base station in sectors 2 and 3 of cell 1 and sectors 1-3 of cell 2, in areas of the interior region FPS 0 of cell 1, only sub-portions 976, 978 and 980 of the available frequency band can be employed by base stations in all sectors. Further, in the cell-edge regions, partitions 964, 966, and 968 are employed by base stations in sectors 1, 2 and 3 of each cell, respectively.

Therefore, because sector 1 of cell 1 uses all 1/1-reuse partition and the 1/3-reuse FPS 1, base stations in sector 1 of cell 1 can use most of the available frequency band to transmit data to users. Because base stations in cells 2 and 3 do not transmit on the 0/1-reuse partition, they will not create interference at sector 1 of cell 1.

It should be noted that step 606 can be optionally employed within method 600 or can be employed independently, as shown in FIG. 9. Furthermore, it should be understood that 0/1 reuse partitions can be employed in alternative ways. For example, the 0/1-reuse sub-partition can be part of the 1/3-reuse partitions, or separately as a partition completely separate from the 1/1 and 1/3 reuse partitions. Either of these scenarios can be implemented by configuring a segment to include a third contiguous portion for a 0/1 reuse partition. In each case, a subset of PRUs is defined on which a base station does not transmit data to the users it services.

In the 802.16m standard, because the subcarriers in minibands are permuted for the benefit of interference diversity, the methods described above can be applied only in subbands to align the partition boundaries. In the standard, subbands comprise a certain number of adjacent PRUs while a miniband comprises a smaller number of adjacent PRUs. Subbands are employed for selective allocations, as they provide a contiguous allocation of PRU in frequency. Minibands are used for frequency diverse allocation and are permuted in frequency. Further, in the standard, available PRUs are grouped into subband PRUs and miniband PRUs, denoted as $PRU_{SB}$ and $PRU_{MB}$ sets.

In accordance with exemplary aspects of the present invention, the mapping of subband PRUs and miniband PRUs to a frequency partition i is given by Equation (1).

$$PRU_{FP_i}(j) = \begin{cases} PRU_{SB}(k_1) & \text{for } 0 \le j < L_{SB,FP_i} \\ PPRU_{MB}(k_2) & \text{for } L_{SB,FP_i} \le j < (L_{SB,FP_i} + L_{MB,FP_i}) \end{cases} \quad (1)$$

where $PRU_{FP_i}$ denotes a PRU allocated to a frequency partition i, $L_{SB,FP_i}$ is the number of subband PRUs in each frequency partition i, $PPRU_{MB}$ is the Permuted $PRU_{MB}$ to which a $PRU_{MB}$ is mapped to ensure frequency diverse PRUs are allocated to each frequency partition, $L_{MB,FP_i}$ is the number of miniband PRUs in each frequency partition i, $FP_0$ is the 1/1-reuse partition, $$k_1 = \frac{L_{SB,FP_0} * i}{3} + \sum_{m=1}^{i-1} L_{SB,FP_m} + j \text{ for } i > 0 \text{ (1/3-reuse partition),}$$

and $$k_1 = \sum_{m=1}^{\left\lfloor \frac{j}{L_{SB,FP_0}/3} \right\rfloor} \left( \frac{L_{SB,FP_0}}{3} + L_{SB,FP_m} \right) + j\bmod\left(\frac{L_{SB,FP_0}}{3}\right)$$

for $i = 0$ (1/1-reuse partition), $$k_2 = \sum_{m=0}^{i-1} L_{MB,FP_m} + j - L_{SB,FP_i}.$$

If a base station does not transmit on $n_1$ PRUs in the 1/1-reuse partition $FP_0$, where $n_1$ is specified in Tables 1B and 3B, discussed herein below, the set of PRUs on which it does not transmit is $PRU_{FP_0}(j)$ for $$\frac{L_{SB,FP_0} - n_1}{3} \cdot m \le j < \frac{L_{SB,FP_0}}{3} \cdot m, \text{ and } 1 \le m \le 3.$$

The tables described herein below provide various mappings for Downlink Frequency Partition Configuration Indicators (DFPCIs) in accordance with exemplary aspects of the present invention. Here, DFPCIs can be used to communicate a frequency partition configuration of a base station, which can include 0/1 reuse information, as noted above. For example, base stations may transmit DFPCIs to each other to inform each other of frequency partitions used by the transmitting base station and base stations may communicate DFPCIs to mobile stations. Further, one or more base stations of a cell or sector may coordinate the frequency partition configuration employed by other base stations in the cell or sector by transmitting DFPCIs to the other base stations. As such, each of the base stations or mobile stations may store one or more of the following tables to map any received DFPCIs to a corresponding frequency partition configuration.

Tables 1A, 2A and 3A provide mapping information between DFPCIs and frequency partition configurations for the 20 MHz; 7 MHz, 8.75 MHz and 10 MHz; and 5 MHz bands, respectively. The Freq. Partitioning columns denote the number of PRUs allocated to frequency partitions $FP_0$-$FP_3$, respectively, FPCT denotes the number of frequency partitions employed by a given frequency partition configuration, and $N_{PRU}$ denotes the total number of PRUs in the available frequency band. Of course, as noted above, each frequency partition in a given frequency partition configuration denoted by a given DFPCI can be allocated a different, mutually exclusive and contiguous set of PRUs. In addition, Tables 1B, 2B and 3B provide mapping information between DFPCIs and the number of PRUs on which a base station does not transmit in a given sector for a cell for the 20 MHz; 7 MHz, 8.75 MHz and 10 MHz; and 5 MHz bands, respectively.

TABLE 1A

Mapping between DFPCI and frequency partitioning for 20 MHz

| DFPCI | Freq. Partitioning ($FP_0:FP_1:FP_2:FP_3$) | FPCT | $FPS_0$ | $FPS_i$ (i > 0) |
|---|---|---|---|---|
| 0 | 96:0:0:0 | 1 | $N_{PRU}$ | 0 |
| 1 | 0:32:32:32 | 3 | 0 | $N_{PRU}$ * 32/96 |
| 2 | 12:28:28:28 | 4 | $N_{PRU}$ * 12/96 | $N_{PRU}$ * 28/96 |
| 3 | 15:27:27:27 | 4 | $N_{PRU}$ * 15/96 | $N_{PRU}$ * 27/96 |
| 4 | 18:26:26:26 | 4 | $N_{PRU}$ * 18/96 | $N_{PRU}$ * 26/96 |
| 5 | 21:25:25:25 | 4 | $N_{PRU}$ * 21/96 | $N_{PRU}$ * 25/96 |
| 6 | 24:24:24:24 | 4 | $N_{PRU}$ * 24/96 | $N_{PRU}$ * 24/96 |
| 7 | 27:23:23:23 | 4 | $N_{PRU}$ * 27/96 | $N_{PRU}$ * 23/96 |
| 8 | 30:22:22:22 | 4 | $N_{PRU}$ * 30/96 | $N_{PRU}$ * 22/96 |
| 9 | 36:20:20:20 | 4 | $N_{PRU}$ * 36/96 | $N_{PRU}$ * 20/96 |
| 10 | 42:18:18:18 | 4 | $N_{PRU}$ * 42/96 | $N_{PRU}$ * 18/96 |
| 11 | 48:16:16:16 | 4 | $N_{PRU}$ * 48/96 | $N_{PRU}$ * 16/96 |
| 12 | 54:14:14:14 | 4 | $N_{PRU}$ * 54/96 | $N_{PRU}$ * 14/96 |
| 13 | 60:12:12:12 | 4 | $N_{PRU}$ * 60/96 | $N_{PRU}$ * 12/96 |
| 14 | 66:10:10:10 | 4 | $N_{PRU}$ * 66/96 | $N_{PRU}$ * 10/96 |
| 15 | 72:8:8:8 | 4 | $N_{PRU}$ * 72/96 | $N_{PRU}$ * 8/96 |

TABLE 1B

Number of PRUs on which an Advanced BS (ABS) does not transmit within the 1/1-reuse partition for 20 MHz

| DFPCI | Coding of 0/1-reuse sub-partition | | | |
|---|---|---|---|---|
| | 0 | 1 | 2 | 3 |
| 0 | 0 | 12 | 24 | 48 |
| 1 | 0 | Reserved | | |
| 2 | 0 | 3 | 6 | 12 |
| 3 | 0 | 6 | 12 | 15 |
| 4 | 0 | 6 | 12 | 18 |
| 5 | 0 | 6 | 12 | 18 |
| 6 | 0 | 6 | 12 | 18 |
| 7 | 0 | 12 | 18 | 24 |
| 8 | 0 | 12 | 18 | 24 |
| 9 | 0 | 12 | 18 | 30 |
| 10 | 0 | 12 | 18 | 30 |
| 11 | 0 | 12 | 24 | 36 |
| 12 | 0 | 12 | 24 | 42 |
| 13 | 0 | 12 | 24 | 48 |
| 14 | 0 | 12 | 30 | 54 |
| 15 | 0 | 12 | 30 | 60 |

TABLE 2A

Mapping between DFPCI and frequency partitioning for 7 MHz, 8.75 MHz and 10 MHz

| DFPCI | Freq. Partitioning ($FP_0:FP_1:FP_2:FP_3$) | FPCT | $FPS_0$ | $FPS_i$ (i > 0) |
|---|---|---|---|---|
| 0 | 48:0:0:0 | 1 | $N_{PRU}$ | 0 |
| 1 | 0:16:16:16 | 3 | 0 | $N_{PRU}$ * 16/48 |
| 2 | 9:13:13:13 | 4 | $N_{PRU}$ * 9/48 | $N_{PRU}$ * 13/48 |
| 3 | 12:12:12:12 | 4 | $N_{PRU}$ * 12/48 | $N_{PRU}$ * 12/48 |
| 4 | 18:10:10:10 | 4 | $N_{PRU}$ * 18/48 | $N_{PRU}$ * 10/48 |
| 5 | 21:9:9:9 | 4 | $N_{PRU}$ * 21/48 | $N_{PRU}$ * 9/48 |
| 6 | 24:8:8:8 | 4 | $N_{PRU}$ * 24/48 | $N_{PRU}$ * 8/48 |
| 7 | 30:6:6:6 | 4 | $N_{PRU}$ * 30/48 | $N_{PRU}$ * 6/48 |

TABLE 2B

Number of PRUs on which an ABS does not transmit within the 1/1-reuse partition for 7 MHz, 8.75 MHz and 10 MHz

| DFPCI | Coding of 0/1-reuse sub-partition | | | |
|---|---|---|---|---|
| | 0 | 1 | 2 | 3 |
| 0 | 0 | 12 | 24 | 36 |
| 1 | 0 | Reserved | | |
| 2 | 0 | 3 | 6 | 9 |
| 3 | 0 | 3 | 6 | 9 |
| 4 | 0 | 3 | 6 | 12 |
| 5 | 0 | 6 | 12 | 18 |
| 6 | 0 | 6 | 12 | 18 |
| 7 | 0 | 6 | 12 | 24 |

TABLE 3A

Mapping between DFPCI and frequency partitioning for 5 MHz

| DFPCI | Freq. Partitioning ($FP_0:FP_1:FP_2:FP_3$) | FPCT | $FPS_0$ | $FPS_i$ (i > 0) |
|---|---|---|---|---|
| 0 | 24:0:0:0 | 1 | $N_{PRU}$ | 0 |
| 1 | 0:8:8:8 | 3 | 0 | $N_{PRU}$ * 8/24 |
| 2 | 6:6:6:6 | 4 | $N_{PRU}$ * 6/24 | $N_{PRU}$ * 6/24 |
| 3 | 12:4:4:4 | 4 | $N_{PRU}$ * 12/24 | $N_{PRU}$ * 4/24 |

TABLE 3B

Number of PRUs on which an ABS does not transmit within the 1/1-reuse partition for 5 MHz

| DFPCI | Coding of 0/1-reuse sub-partition | | | |
|---|---|---|---|---|
| | 0 | 1 | 2 | 3 |
| 0 | 0 | 6 | 12 | 18 |
| 1 | 0 | Reserved | | |
| 2 | 0 | 3 | 6 | Reserved |
| 3 | 0 | 3 | 6 | 9 |

It should be noted that, alternatively, instead of using a separate table to specify the size of the 0/1-reuse sub-partition, a single table can be defined for each bandwidth that specifies the sizes of 1/1-reuse, 0/1-reuse, and 1/3-reuse partitions separately. For example, Tables 1A and 1B can be combined into one table with 64 rows, where each row specifies a combination of 1/1-reuse, 0/1-reuse and 1/3-reuse partition sizes.

Returning to FIG. 6, optionally, at step 608, for at least one sector in at least one of the cells, the control unit 502 may deboost transmit power over PRUs units on a second contiguous portion of physical resource units allocated to a different sector for transmission of data to users. For example, in step 606 it was assumed that a base station may not transmit on subbands that are not allocated to it (including the 0/1-reuse sub-partition). One variation is to permit each base station in each sector to use subbands which are not allocated to it, which may include the 0/1-reuse sub-partition, after suitably de-boosting (or reducing) its transmit power over those subbands. The de-boosted power levels can be pre-determined and/or adjusted over a slow time-scale. Transmission at a de-boosted power level will not cause significant interference to users scheduled on the same subbands in adjacent sectors.

Thereafter, at step 610, control units 510 of one or more base stations of each sector can transmit data to the users in the sectors in accordance with the assigned physical resource unit configurations.

As noted above, other exemplary embodiments of the present invention may include dynamic FFR methods and systems. Exemplary dynamic FFR embodiments permit a dynamic PRU allocation in each sector. Restrictions on the PRU allocations and the PRU update may be placed in each sector to enable efficient communication between base stations in accordance with exemplary aspects of the present invention. For example, at most two consecutive sets of PRUs may be allocated to the sector and, during each update, the PRU allocation interval, which is a contiguous set of PRUs allocated to a given sector, is only updated at either boundary by a size of at most one. A base station in each sector may then compute the utility change if a single in-neighbor sector updates its PRU allocation interval and may report such information to the in-neighbor sector. In-neighbor sectors and out-neighbor sectors are described in more detail below. Further, the base station may determine the optimal PRU allocation update in a variety of ways that can maximize the total utility change of itself and/or its out-neighbor sectors. For example, to avoid concurrent update, a base station of each sector may employ a probabilistic or a greedy approach to update its PRU interval.

Figure 10:
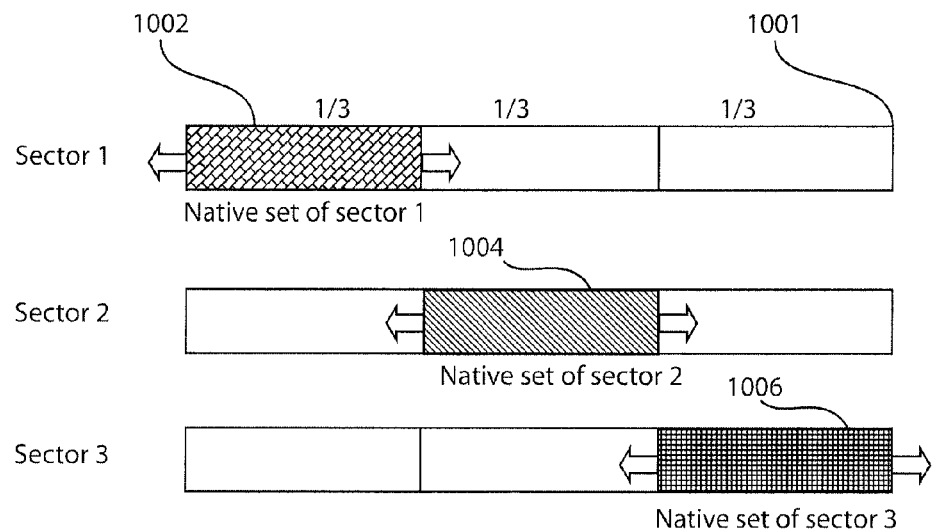
FIG. 10 is a high level diagram of a frequency partition configuration for sectors of a given cell in accordance with exemplary dynamic fractional frequency reuse embodiments of the present invention.

In exemplary dynamic FFR embodiments, a consecutive set of PRUs can be constructed for each sector of a cell. It should be noted that "consecutive" here is in the circular sense. For example, PRUs N−1, N, 1, 2, are considered consecutive. Such strategy can reduce the overhead of disseminating the set of PRUs used by each sector, as a specification of the lower bound and the upper bound of the PRU interval allocated to each sector is sufficient to convey the interval allocated to a sector. Each sector can be allocated a native set of PRUs based on 1/3-reuse. For example, with reference to FIG. 10, Sector 1's native set 1002 of PRUs can be (1, ..., N/3), Sector 2's native set 1004 of PRUs can be (N/3+1, ..., 2N/3), and Sector 3's native set 1006 of PRUs can be (2N/3+1, ..., N). In the following description, an interval is used to denote all integers in the interval. For example, interval [1, N/3] represents (1, 2, ..., N/3). The initial native set can each occupy a mutually exclusive portion of an available band or subband 1001. In the example of FIG. 10, each native set occupies ⅓ of a band or a subband.

Initially, each sector can be assigned with its native set of PRUs for downlink and/or uplink transmission. Thereafter, the PRU interval for each sector may be updated periodically. For example, the PRU interval may be updated once every K super-frames and the update can be included in the super-frame header (S-SFH) of a super-frame. The following restrictions may be applied during the PRU interval update to reduce complexity of message exchange between base stations.

1. Each sector is allocated with a consecutive set of PRU, termed a "PRU interval."
2. Each sector is constrained to have at least one PRU from its initial native set at all times.
3. During each update, the interval length changes by at most two: it either increases or decreases the lower bound and/or upper bound of the interval by at most one.

Figure 11:
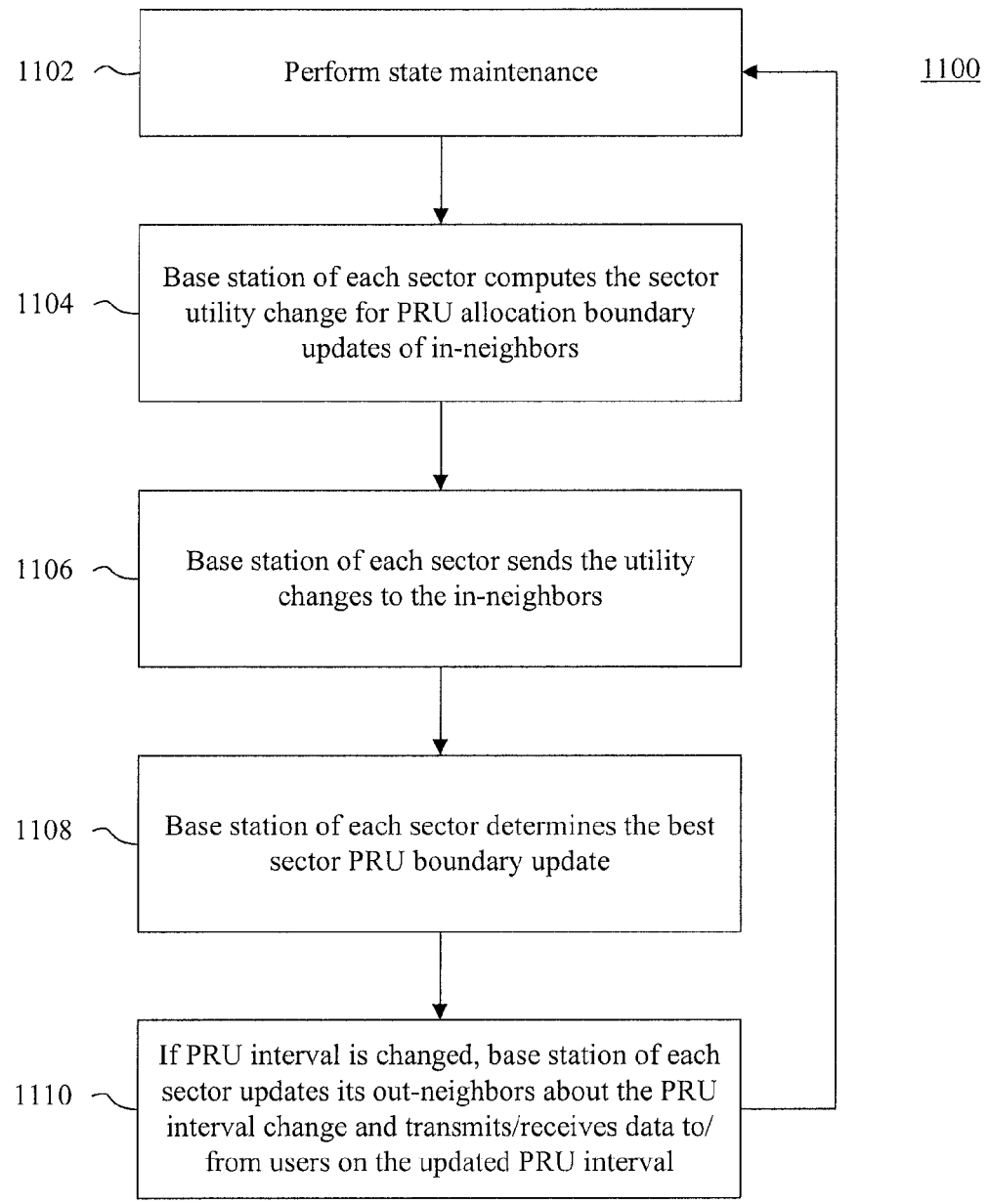
FIG. 11 is a high level block/flow diagram of a method for periodically updating the frequency partition configuration of sectors in accordance with one exemplary dynamic fractional frequency reuse embodiment of the present invention.

Referring now to FIG. 11, a method 1100 for periodically updating the frequency partition configuration of sectors in accordance with one exemplary dynamic FFR embodiment of the present invention is illustrated. At block 1102, one or more base stations of each sector can perform state maintenance. For example, one or more base stations of each sector may maintain an out-neighbor set and an in-neighbor set of sectors. Further, an in-neighbor set of a given sector is a set of K neighboring sectors that cause strong interference to the given sector. The set of K neighboring sectors can be fixed. In addition, if a sector A is an in-neighbor of sector B, sector B is termed an out-neighbor of sector A. Thus, an out-neighbor sector of a given sector A is another sector which is strongly interfered by the current sector A. One or more base stations of each sector maintains the PRU intervals, which, as noted above, may be defined by the lower and upper bounds of the intervals, of all the in-neighbors of the sector. All terms "sector" employed herein can also equivalently be used to refer to a "base station." It should be noted that in-neighbor and out-neighbor sets may have, and in many cases will have, overlapping sectors. Moreover, sectors belonging to the same cell may be in-neighbors and out-neighbors of each other. Which sectors constitute in-neighbors or out-neighbors depends on the mobile station or user distributions in a cell and/or sector, which may vary.

Below, some examples of in-neighbors and out-neighbors that can be employed are provided. However, other examples may be used in accordance with the present invention. Here, an interference metric (IM) $\lambda_s(b)$ of all other sectors with respect to a given sector b is employed and the sectors can be sorted such that $$\lambda_{s1}(b) \geq \lambda_{s2}(b) \geq \ldots \geq \lambda_{sN}(b)$$

The in-neighbor set, $NS_{in}(b)$, of a sector b can include K neighboring BSs with the largest IMs, i.e., $$NS_{in}(b) = \{s_1(b), s_2(b), \ldots, s_K(b)\}.$$

The out-neighbor set $NS_{out}(b)$, of a sector b can include the sectors whose in-neighbor set includes b, i.e., $$NS_{out}(b) = \{s : s \neq b, b \in NS_{in}(b)\}$$

Thus, the in-neighbor and out-neighbor sets here depend on the interference metric (IM).

Below are three example definitions of IM $\lambda_s(b)$. However, it should be understood that other examples of the interference metric can be used. A dynamic IM, can be defined as $$\lambda_s(b) = \frac{1}{|J_b|} \sum_{k \in J_b} \frac{G_{s,k}}{G_{b,k}}$$

where $J_b$ is the set of clients or users serviced by sector b, $G_{p,q} \geq 0$ is the effective channel gain, which can include antenna gain, path loss, shadowing and fast fading, from sector p to user q. It should be noted that the ratio $G_{s,k}/G_{b,k}$ captures the amount of interference caused by sector s to user $k \in J_b$ and $\lambda_s(b)$ is computed by averaging the ratio $G_{s,k}/G_{b,k}$ over all users k served by sector b.

In another example, a semi-static IM can be is defined as $$\lambda_s(b) = \frac{1}{|J_b|} \sum_{k \in J_b} \frac{E_{fast}\lfloor G_{s,k} \rfloor}{E_{fast}\lfloor G_{b,k} \rfloor}$$

where the expectation $E_{fast}[.]$ is taken over the fast fading statistics. It should be noted that $E_{fast}[G_{s,k}]$ only depends upon antenna gain, pathloss and shadowing, and can be estimated by each user based on the moving average of the instantaneous channel gain $G_{s,k}$.

A static IM, can be defined as $$\lambda_s(b) = E_{drop}\left[\frac{E_{fast,slow}\lfloor G_{s,k}\rfloor}{E_{fast,slow}\lfloor G_{b,k}\rfloor}\right]$$

where the expectation $E_{fast,shadow}[.]$ is taken over the shadowing and fast fading statistics, while the expectation $E_{drop}[.]$ is taken over all possible drops of user $k \in J_b$. It should be noted that the static IM only depends upon antenna gain and pathloss, and can be precomputed by each base station once a statistical model for user drops, shadowing and fast fading and a physical model for antenna beam-pattern and pathloss are determined.

Returning to FIG. 11, after compiling the in-neighbor set in block 1102, at block 1104 one or more base stations of each sector may compute the increase (or decrease) of its sector utility if a PRU interval of any single in-neighbor is changed. For example, for a given allocation of frequency partitions, one or more base stations of each sector computes a utility function for the sector, which may be based on the long-term average channel gain for both interference power and signal power. In accordance with one exemplary aspect of the present invention, an arbitrary change of the PRU interval is not permitted. Rather, only a few possible, predetermined ways of adjusting the PRU interval is permitted. Two possible options to update the PRU interval are provided in Tables 4 and 5 below. However, it should be understood that other options are also possible.

As illustrated below, Tables 4 and 5 provide a "minimum" option and a "maximum" option, respectively, of updating the PRU intervals for any one period of, for example, K superframes. As shown in the tables, possible ways of adjusting a current interval for different interval lengths are provided. Thus, one or more base stations of each sector can compute the utility change to that sector for each possible adjustment made by an in-neighbor sector. Further, the calculation can be made for each in-neighbor sector. It should be noted that an interval [a, b] in Tables 4 and 5 means only the integer number(s) in the interval, i.e., a, a+1, . . . , b.

TABLE 4

| Current interval length >1 | | Current interval length = 1 | |
| --- | --- | --- | --- |
| Current interval | New interval | Current interval | New interval |
| [a, b] | [a + 1, b] | [a, a] | [a + 1, a + 1] |
| | [a − 1, b] | | [a − 1, a − 1] |
| | [a, b + 1] | | [a − 1, a] |
| | [a, b − 1] | | [a, a + 1] |

TABLE 5

| Current interval length >1 | | Current interval length = 1 | |
| --- | --- | --- | --- |
| Current interval | New interval | Current interval | New interval |
| [a, b] | [a + 1, b] | [a, a] | [a + 1, a + 1] |
| | [a − 1, b] | | [a − 1, a − 1] |
| | [a, b + 1] | | [a − 1, a] |
| | [a, b − 1] | | [a, a + 1] |
| | [a + 1, b + 1] | | [a − 1, a + 1] |
| | [a − 1, b − 1] | | |
| | [a − 1, b + 1] | | |
| | [a + 1, b − 1] | | |
| | (only if b >= a + 2) | | |

Thus, at block 1104, one or more base stations of each sector can compute the sector utility change at the present sector if the PRU interval boundary of an in-neighbor sector changes according to either Table 4 or 5, assuming only one neighboring sector changes its PRU interval boundary. Only changes from single neighbor sector may be considered to reduce the overhead. Further, utility changes are computed for every in-neighbor. Accordingly, if a sector has K in-neighbors, there are only 4*K possible ways of adjusting the allocated PRU interval according to the minimum changing option in Table 4 and at most 8*K possible ways of changing according to Table 5.

It should be understood that there are many ways to define the total utility in a sector and to calculate the rate of increase and/or decrease of utility in a sector. One example of utility is described herein below. Here, the utility of a user can be defined as the log function of the user's total received throughput and the total sector utility can be defined as the total utility of all users in the sector. It is assumed here that users select a sector with the highest long-term average receiving power. The current set of users in a sector s is denoted I(s), and for a user k, the current long-term average throughput is denoted as $r_k$. Accordingly, the total utility of sector s is $$U(s) = \sum_{k \in I(s)} \log(r_k)$$

In the approach described above for updating the assigned PRU interval of a sector with respect to Tables 4 and 5, the power of at most two PRUs is changed for a sector. Therefore, to determine the appropriate adjustment of a PRU interval, the maximum total utility increase (or minimum total utility decrease) caused by the power update should be determined. In either case, the maximum total new utility of the sector after the power update should be found. One potential solution is discussed herein below.

First, it is assumed that only the power level on one PRU is changed. Thus, either all users in a sector will have a positive data rate change or all will have a negative data rate change on that particular PRU. It is also assumed that the data rate change on the PRUs is $\delta_k$ for user k if the PRUs are allocated to the user k solely. $\delta_k$ can be computed based on the signal to interference ratio (SINR) information. Because the PRUs are generally not solely allocated to a single user, the time allocated to user k for the PRU is denoted as $t_k$. The new total utility is $$V(s) = \sum_{k \in S} \log(r_k + t_k \delta_k) \text{ s.t. } t_k \geq 0, \sum_{k \in S} t_k = 1.$$

It should be noted that $\delta_k$ is either positive or negative for all k. In order to maximize V(s), Lagrangian multiplier theory may be applied to solve the problem. One exemplary solution is provided in the algorithm of Table 6.

TABLE 6

Algorithm to maximize V(s):

1. Find a water level λ such that $$\sum_{k \in S} \left[ \lambda - \frac{r_k}{\delta_k} \right]^+ = 1.$$

Note that λ is positive if all $\delta_k > 0$ and vice versa.

2. $t_k = \left[ \lambda - \frac{r_k}{\delta_k} \right]^+$

3. Compute $$V(s) = \sum_{k \in S} \log(r_k + t_k \delta_k)$$

It should be also be noted that if the power on two PRUs is updated (e.g, [a,b]=>[a+1, b+1]), the sector utility change can be computed sequentially.

At block 1106, one or more base stations for each given sector may send to one or more base stations in an in-neighbor sector the sector utility change at the given sector for all possible PRU interval boundary changes at that particular in-neighbor sector according, for example, to either Table 4 or 5. Moreover, one or more base stations of each sector may transmit a corresponding set of utility changes to every in-neighbor sector, or, more specifically to one or more base stations in every in-neighbor sector.

At block 1108, each sector can determine the optimal PRU interval update at itself. For example, after one or more base stations of each sector receives the utility change from all the sector's out-neighbors, the base station(s) of the sector can compute the total utility change on all its out-neighbors and itself for each possible PRU interval boundary updates. For example, one or more base stations of any given sector can compute the total utility change of the given sector and its out-neighbor sectors when the given sector's PRU interval boundary changes according to the Table 4 or 5 assuming that all other sectors do not update their PRU intervals. Thereafter, the one or more base stations of the given sector can find the maximum total utility change for all possible PRU interval updates. If the maximum total utility change is less than α ($\alpha \geq 0$), the given sector's PRU remains un-changed. Otherwise, the given sector's PRU interval can change in accordance with a variety methods. For example, the given sector's PRU interval can change in accordance with a probabilistic update method or a greedy update method.

In the probabilistic update method, the one or more base stations of a given sector changes to the new PRU interval having the highest total utility change with probability p if the highest total utility change is greater than α. Otherwise the PRU interval remains un-changed. For example, the base station or control unit 502 may randomly select a floating number between 0 and 1. If the highest total utility change is greater than/equal to α and the randomly selected number is at or below p, then the base station changes to the new PRU interval attaining the highest total utility change. If the highest total utility change is greater than/equal to α and the selected random number is above p, or if the highest total utility change is less than α, then the PRU interval remains un-changed.

In the greedy update method, the one or more base stations of a given sector exchanges the utility change with the base stations of the given sector's "interfering neighbors." Two sectors are "interfering neighbors" either if one is the in-neighbor of the other or they share a common out-neighbor. In accordance with one exemplary aspect of the present invention, only if a sector has the maximum total utility increase among all its interfering neighbors, the sector changes to the best new PRU interval having the maximum utility increase and remains un-changed otherwise.

At block 1110, if the PRU interval of a sector is changed, that sector updates its out-neighbors of the change and the sectors transmit and/or receive data to or from the mobile stations in accordance with any updated frequency partition configuration. Thereafter, the method may be repeated for the next set of K-super frames.

It should be understood that method 1100 can be initialized with any baseline configuration having four partitions (FPS 0, FPS 1, FPS 2, FPS 3), as shown in FIG. 1, where the 1/1 reuse partition FPS 0 occupies a fraction (1−ρ) (0<ρ<1) of the total available bandwidth (subbands) and the 1/3-reuse partition is equally divided into three partitions, each occupying ρ/3 of the total available bandwidth (subbands). In exemplary embodiments of the present invention, method 1100 can be applied only to the portion of the bandwidth occupied by FPS 1 to FPS 3. The 1/1 reuse partition zone corresponding to FPS 0 can remain fixed. However, it should also be understood that method 1100 can be applied to one or more frequency partition configurations having any number of frequency partitions. Generally, method 1100 can be applied to physical resource units dedicated for use by sectors in a cell in an outer area of the cell, for example, area 114, while physical resource units dedicated to all sectors of the cell in vicinities of the center of the cell, for example, area 115, can remain unchanged.

Another simple variation is deboosting transmit power over PRUs units on a portion of physical resource units allocated to a different sector for transmission of data to users. For example, step 608 of method 600 can be added to method 1100 and implemented using control unit 502.

Figure 12:
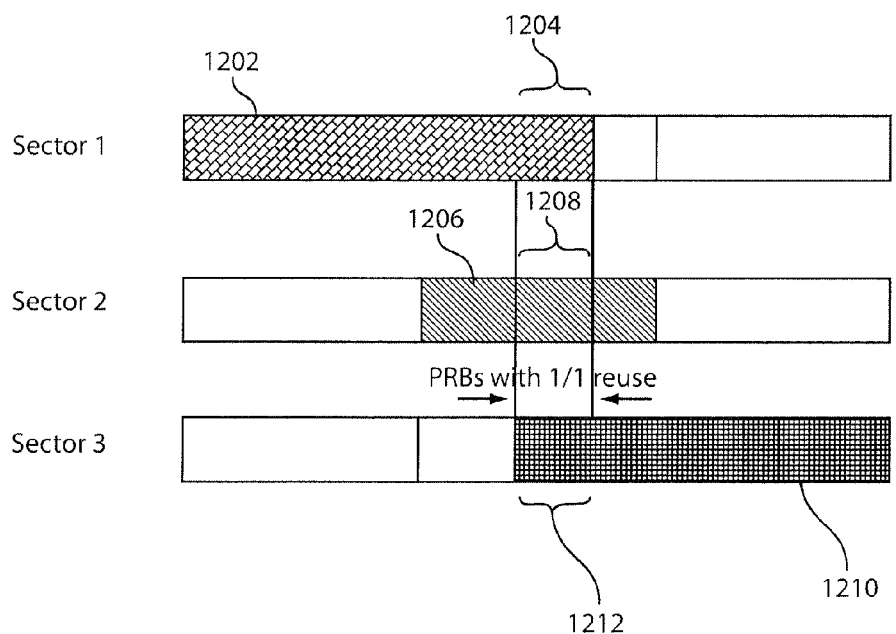
FIG. 12 is a high level diagram of a frequency partition configuration for sectors of a given cell illustrating the support of a 1/1 reuse partition in accordance with exemplary dynamic fractional frequency reuse embodiments of the present invention.

It should also be noted that if the method 1100 is applied to the entire available frequency band, a situation may arise in which the PRU intervals of two sectors intersect, effectively resulting in a 2/3-reuse. In order to form 1/1-reuse, the procedure 1100 may be constrained to ensure that at least a portion of the PRU interval of one sector is fully covered by the union of the other two PRU intervals, as shown in FIG. 12. For example, as shown in FIG. 12, a portion 1204 of the PRU interval 1202 for sector 1 of a given cell overlaps with portions 1208 and 1212 of the PRU intervals 1206 and 1210 of sectors 2 and 3, respectively, of the given sector.

Figure 13:
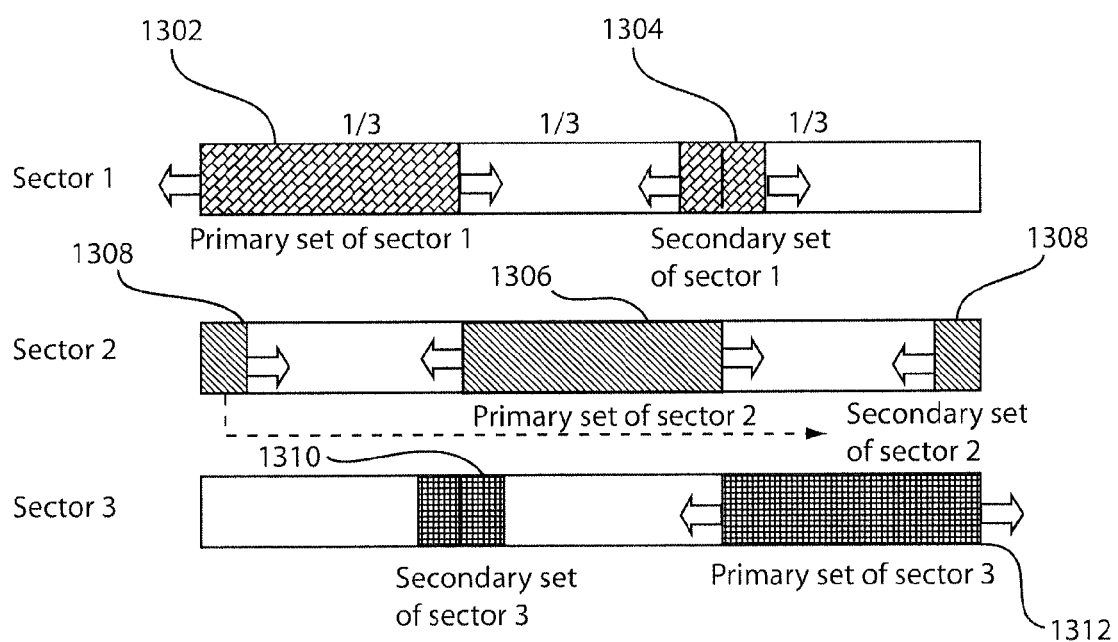
FIG. 13 is a high level diagram of a frequency partition configuration for sectors of a given cell incorporating two different physical resource units per sector to support one or more 1/1 reuse partitions in accordance with exemplary dynamic fractional frequency reuse embodiments of the present invention.

To support more flexibility, a sector may be configured to have two consecutive sets of the PRUs, or two PRU intervals, for transmission or reception. One may be referred to as a primary PRU interval and the other may be referred to as a secondary PRU interval. The primary PRU interval may correspond to the native set discussed above with respect to FIGS. 10 and 11. Similarly, the secondary PRU interval may have the same characteristics of the primary PRU interval in that the secondary PRUs can be used in the same area of the sector to which primary PRUs are allocated, such as, for example, area 115 of FIG. 1. An example is provided in FIG. 13, in which sector 1 of a given cell is allocated a primary set of PRUs 1302 and a secondary set of PRUs 1304. In turn, sectors 2 and 3 of the given cell are allocated primary PRU sets 1306 and 1312, respectively and are allocated secondary PRU sets 1308 and 1310, respectively. Here, the intersection of the secondary set 1304 of Sector 1 and the primary sets of Sectors 2 and 3 1306 and 1312 forms 1/1-reuse PRUs. It should be understood that any configuration using primary and secondary sets of PRUs for each sector can be used, as long as any set of PRUs, primary or secondary, of each corresponding sector overlap to form 1/1 reuse near the vicinity of the center of the given cell.

Accordingly, as each sector has two PRU intervals, [a, b] may be defined as the primary set and [c,d] may be defined as the secondary set. Similarly two options of changing the PRU intervals as in Table 4 and 5 can be employed. For simplicity, only the minimum option of changing the PRU intervals is described in Table 7. The maximum option of changing the PRU intervals can be similarly devised, similar to Table 5, as understood by those of ordinary skill in the art in view of the teachings described herein.

TABLE 7

Minimum option of changing the PRU interval

| Current interval | Current primary interval length >1 New interval | Current interval | Current primary interval length = 1 New interval |
|---|---|---|---|
| [a, b], [c, d] | [a + 1, b], [c, d] | [a, a], [c, d] | [a + 1, a + 1], [c, d] |
| | [a − 1, b], [c, d] | | [a − 1, a − 1], [c, d] |
| | [a, b + 1], [c, d] | | [a − 1, a], [c, d] |
| | [a, b − 1], [c, d] | | [a, a + 1], [c, d] |
| | [a, b], [c + 1, d] | | [a, a], [c + 1, d] |
| | (only if c + 1 ≤ d) | | (only if c + 1 ≤ d) |
| | [a, b], [c − 1, d] | | [a, a], [c − 1, d] |
| | [a, b], [c, d + 1] | | [a, a], [c, d + 1] |
| | [a, b], [c, d − 1] | | [a, a], [c, d − 1] |
| | (only if c + 1 ≤ d) | | (only if c + 1 ≤ d) |

Once the possible ways of updating the current PRU intervals are defined, the procedure of interference mitigation is identical to that described above. Namely, the three restrictions for PRU interval updates and method 1100 applied to the native set as discussed above can be applied to the primary and the secondary sets of intervals, respectively, in exactly the same manner.

Accordingly, in exemplary embodiments of the present invention, for downlink (DL) and/or uplink (UL) FFR, each sector (or, equivalently, one or more base stations in the sector) may occupy up to two consecutive sets of PRUs. The boundaries of the two consecutive sets of PRUs may be adjusted to accommodate dynamic and un-even traffic conditions. Specifically, in accordance with exemplary aspects of the present invention, in order to accommodate un-even user and traffic distributions, the DL and/or UL frequency allocation for a sector (or BS) can comprise one or two sets of circularly contiguous PRUs (referred to as PRU intervals) without power deboosting. In this case the DL and/or frequency partition configuration includes the lower bounds and upper bounds of the PRU intervals. The boundaries or width of the PRU intervals may be adjusted to accommodate dynamic user and traffic conditions.

Figure 14:
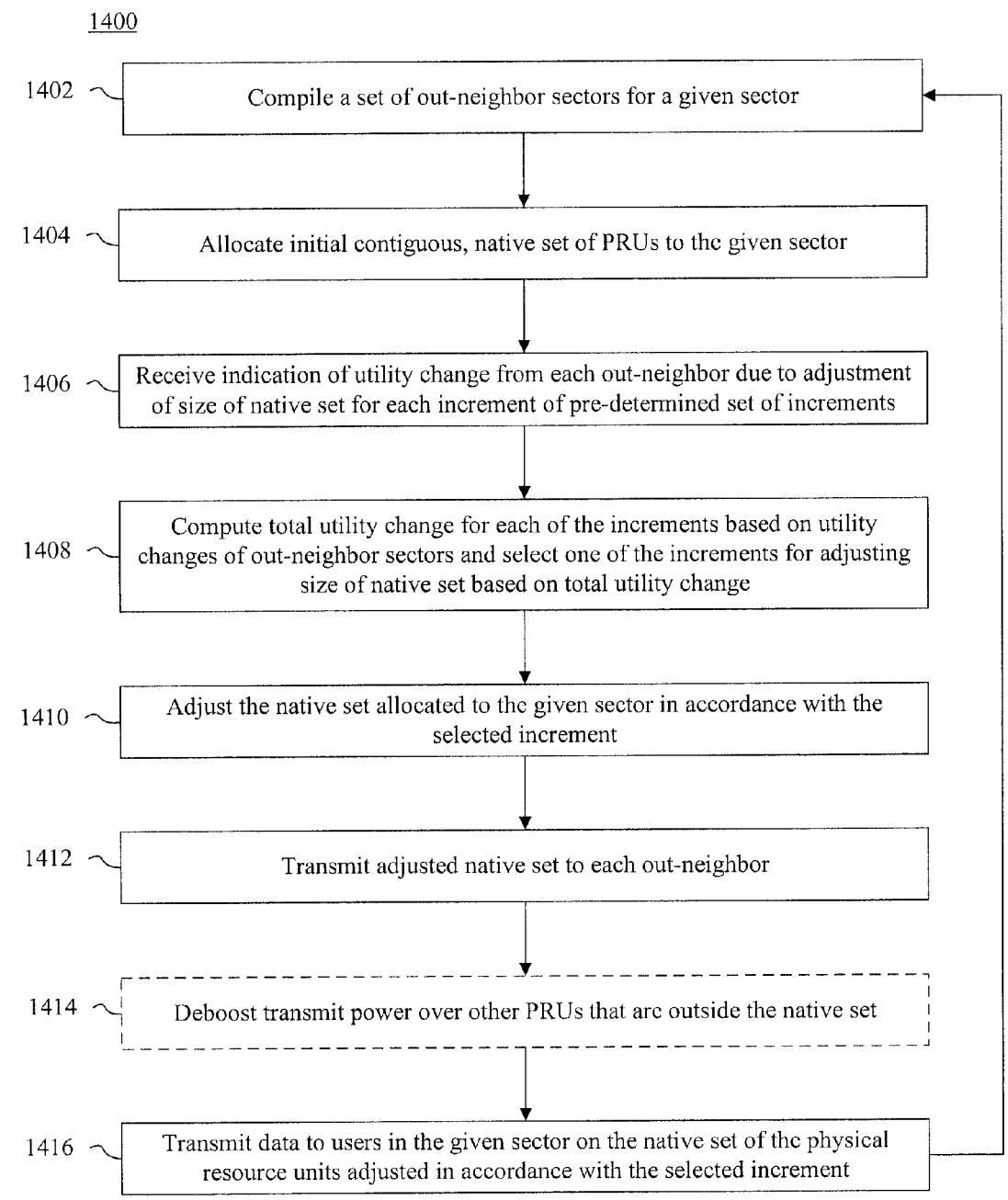
FIGS. 14 and 15 are high level block/flow diagrams of dynamic fractional frequency reuse methods for assigning physical resource units of a contiguous frequency band to sectors of cells in accordance with exemplary embodiments of the present invention.
Figure 15:
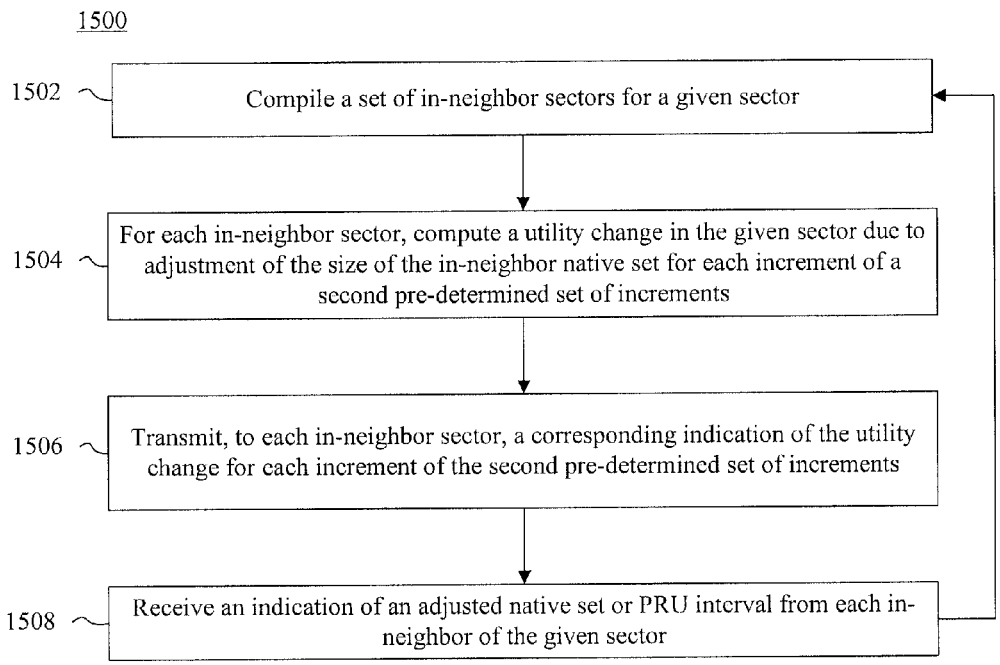

Referring now to FIGS. 14-15 with continuing reference to FIG. 5, exemplary fractional frequency reuse methods 1400 and 1500 for assigning physical resource units of a contiguous frequency sub-band to a given sector of a cell including at least one base station in accordance with exemplary embodiments of the present invention is illustrated. It should be understood that FIGS. 14 and 15 and the discussion associated therewith provided herein below are systematic descriptions of dynamic FFR schemes discussed above. As such, any of the features of dynamic FFR schemes discussed above can be implemented in and with methods 1400 and/or 1500. In addition, method 1400 corresponds to a method performed at a given base station that acts as an in-neighbor to one or more other base stations. In turn, method 1500 corresponds to a method performed at a given base station that acts as an out-neighbor to one or more other base stations. Thus, it should also be understood that methods 1400 and 1500 can be performed simultaneously by the same base station during the same period of, for example, K-super frames. Moreover, methods 1400 and 1500 can be performed simultaneously by every base station, or a subset of base stations, of every sector of a given cell. Similarly, methods 1400 and 1500 can be performed simultaneously by every base station, or a subset of base stations, of every cell, or a subset of cells, of a cellular network. Thus, where a base station performs method 1400, the base station may exchange information with other base stations performing method 1500. Additionally, where a base station performs method 1500, the base station may exchange information with other base stations performing method 1400

In accordance with method 1400, at step 1402, a control unit 502 of a given base station 500 may compile a set of out-neighbor sectors for a given sector in which the given base station is disposed in accordance with the discussion of in-neighbors and out-neighbors provided above. For example, control units of base stations of out-neighbor sectors of the given sector can determine that the given sector is an in-neighbor using, for example, the interference metric discussed above. Thereafter, the base stations of the out-neighbors may transmit an indication that the given sector is an in-neighbor of the out-neighbors. Based on the indications received through receiver 506, the control unit 502 of the given base station may compile the set of out-neighbors. It should be noted that the set of out-neighbors may change over time in response to a change in user-distribution throughout a sector and/or a cell.

At step 1404, the control unit 502 of the given base station may allocate an initial contiguous, native set of the physical resource units dedicated for transmission of data to users in the given sector. For example, the initial native set may correspond to any one of native sets 1002-1006 discussed above with respect to FIG. 10. Further, the native sets of each sector can be pre-configured at initialization of the base stations in a given, corresponding cell.

At step 1406, from at least one base station in each out-neighbor sector, the control unit 502 through receiver 506 may receive an indication of a utility change due to adjustment of the size of the native set for each increment of a pre-determined set of increments. As indicated above, an out-neighbor sector can be a sector that is subjected to interference from the given sector that exceeds an interference threshold. The interference threshold may correspond to the minimum interference of the set of K neighboring sectors, of the out-neighbors, with the largest IMs, as discussed above, or may simply be an IM threshold, where any sector that subjects an out-neighbor to interference that is greater than the IM threshold is deemed to be an in-neighbor. Moreover, the utility change may, for example, correspond to the change of U(s) of an out-neighbor of the given sector resulting from an adjustment to the size of the native set or PRU interval allocated to the given sector. Further, a pre-determined set of increments may, for example, correspond to any one of Tables 4, 5 and 7 and an increment may correspond to any new interval entry in Tables 4, 5 and 7. Thus, as discussed above, the given base station may receive a utility change, from at least one base station in each out-neighbor sector, for each increment of the pre-determined set of increments. It should also be noted that at step 1406, at least one base station from each of the out-neighbor sectors may transmit to the given base station a utility, for example, U(s), for each corresponding increment and the control unit 502 of the given base station may compute the change in U(s) for each out-neighbor based on a current value of U(s) for the out-neighbor received during initialization of the out-neighbor set or during a previous iteration.

At step 1408, the utility module 508 may compute a total utility change for each of the increments based on utility changes of the out-neighbor sectors and the control unit 502 may select one of the increments for adjusting the size of the native set based on the total utility change. For example, as noted above, for each possible PRU interval boundary update, a base station, via utility module 508, may compute the total utility change of itself and its out-neighbor sectors and thereafter may find the maximum total utility change for all possible increments of the pre-determined set of increments. The control unit 502 may then select one of the increments to adjust the native set or PRU interval of the given sector. For example, the selection may be performed, if the total maximum, positive utility change is at or exceeds some threshold, $\alpha$, as discussed above. Further, as noted above, the selection and adjustment may be performed in a variety of ways. For example, the control unit 502 may select, for adjustment of the native set of the given sector, the increment corresponding to the highest total utility of the given sector and the out-neighbor sectors with probability p, as discussed above. Conversely, the control unit 502 may determine that the PRU interval or the native set of the given sector remains unchanged if the total utility change is below a threshold $\alpha$.

Figure 16:
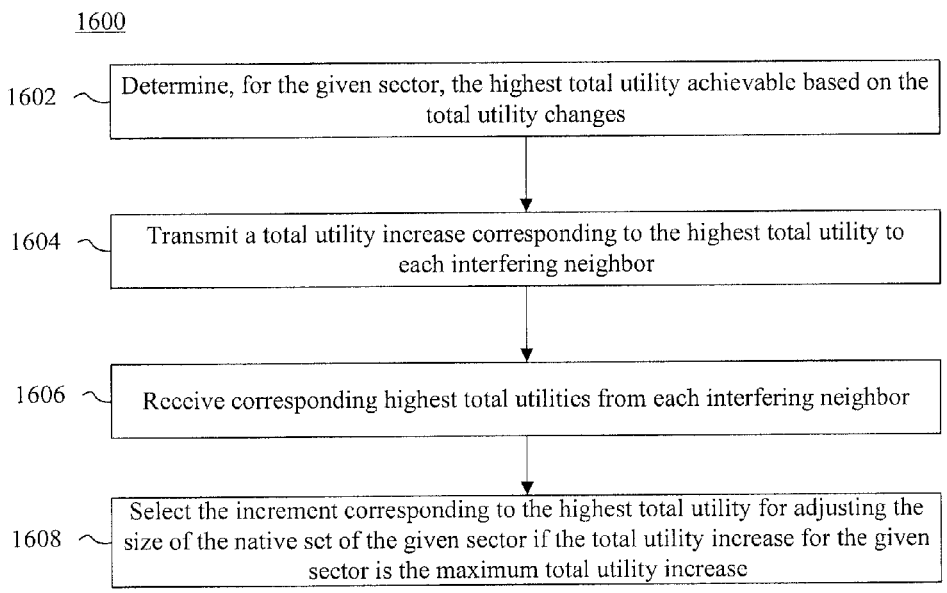
FIG. 16 is a high level block/flow diagram of a method for selecting an increment for adjusting a native set or a physical resource unit interval for a sector in accordance with an exemplary embodiment of the present invention.

Referring now to FIG. 16, with continuing reference to FIGS. 5 and 14, another exemplary method 1600 for selecting one of the increments for adjusting the size of the native set at step 1408 in accordance with an exemplary embodiment of the present invention. Method 1600 is an example of the greedy update method discussed above and may be implemented by the control unit 502

Method 1600 may begin at step 1602, in which the control unit 502 may determine, for the given sector, the highest total utility achievable based on the total utility changes. For example, the control unit 502 may, as noted above, determine the utilities of each of the out-neighbors and itself for every increment of the predetermined set of increment. The utilities of out-neighbors may be determined, for example, by using the indications of the utility changes and/or the utility values received from base stations of out-neighbor sectors. Further, the utilities of the outneighbors and the given sector may be determined, for example, by using U(s), as discussed above. Based on the determined utilities, the control unit 502 may compute the highest total utility achievable for both the given sector and the out-neighbors and may find the increment corresponding to the highest total utility achievable. The highest total utility achievable may simply be the sum of all the out-neighbor utilities and the utility of the given sector for the corresponding increment.

At step 1604, using the transmitter 504, the control unit 502 may transmit a total utility increase, over a current total utility, corresponding to the highest total utility to at least one base station in each interfering neighbor. As indicated above, an interfering neighbor can correspond to at least one of: a sector that has at least one common out-neighbor sector with the given sector, a sector that is an out-neighbor sector of the given sector or a sector that is an in-neighbor of the given sector. As also indicated above, an in-neighbor of the given sector subjects the given sector to interference that exceeds an interference threshold. The interference threshold may correspond to the IM threshold discussed above, and may have the same or different value of the IM threshold that determines the out-neighbors of the given sector. Further, the total utility increase may simply be the difference between the highest total utility achievable and the current total utility. As noted above, the highest total utility may be the sum of the utilities of the given sector and the utilities of all of the given sector's out-neighbors.

At step 1606, the control unit 502 may receive, via receiver 506, corresponding total utility increases from at least one base station in each interfering neighbor. In other words, the given base station can receive total utility increases, over a current total utility, from each interfering neighbor. It should be noted that the highest total utility and/or total utility increase of each interfering neighbor can be computed by one or more base stations disposed in a corresponding interfering neighbor sector in any of the manners in which the control unit 502 of the given sector can compute the highest total utility and/or total utility increase, as discussed above.

At step 1608, the control unit 502 can select the increment corresponding to the highest total utility for adjusting the size of the native set of the given sector if the total utility increase for the given sector is the maximum total utility increase with respect to the total utility increases of interfering neighbors. For example, as discussed above with respect to the greedy update method, the given base station of the given sector adjusts the native set or the PRU interval allocated to the given sector according to the increment corresponding to the highest total utility determined in step 1602 if the given sector has the maximum total utility increase among all its interfering neighbors. Thus, the given base station adjusts the native set or PRU interval of the given sector to the best new PRU interval having the maximum total utility increase and can leave the native set or PRU interval of the given sector unchanged otherwise.

Returning to method 1400, at step 1410, the control unit 502 may adjust the native set, or, equivalently, the PRU interval, allocated to the given sector in accordance with the selected increment.

At step 1412, the control unit 502 may employ the transmitter 504 to notify one or more base stations of each out-neighbor of any adjustment to the native set or the PRU interval allocated to the given sector. For example, the control unit may simply send, to each out-neighbor, the boundaries of the adjusted native set or PRU interval, as indicated in any of Tables 4, 5 and 7.

Optionally, at step 1414, the control unit 502 may deboost transmit power over other PRUs along the contiguous frequency band that are outside the native set or PRU interval allocated to the given sector for transmission of data to users in the given sector on the other PRUs, as discussed above.

At step 1416, the control unit 502 may employ transmitter 504 to transmit data to the users in the given sector on the native set of the physical resource units adjusted in accordance with the selected increment.

Thereafter, method 1400 may be iterated for each predetermined period. For example, as indicated above, the period may correspond to K super-frames.

Turing now to method 1500 of FIG. 15, as noted above, method 1500 is directed to the given base station's role as an out-neighbor to one or more other base stations and can be performed simultaneously with method 1400 during the same period (e.g., a period of K-super frames). Method 1500 can begin at step 1502, in which the control unit 502 can compile a set of in-neighbor sectors for the given sector. As indicated above, an in-neighbor sector subjects the given sector to interference that exceeds an interference threshold. Thus, the control unit may select the set of in-neighbors based on the interference threshold. As stated above, the interference threshold may, for example, correspond to the minimum interference of the set of K neighboring sectors with the largest IMs, as discussed above, or may simply be an IM threshold, where any sector that subjects the given sector to interference that is greater than the IM threshold is deemed to be an in-neighbor. Further, as indicated above, each sector may be allocated a contiguous, native set of PRUs, such as PRU intervals 1002-1006, dedicated for transmission of data to users in the corresponding sector.

At step 1504, the control unit 502, for each in-neighbor sector, can compute compute a utility change in the given sector due to adjustment of the size of the in-neighbor native set for each increment of a second pre-determined set of increments. Similar to method 1400, the utility change may, for example, correspond to the change of U(s) of the given sector resulting from an adjustment to the size of the native set or PRU interval allocated to an in-neighbor and is computed for every in-neighbor sector. Further, a pre-determined set of increments may, for example, correspond to any one of Tables 4, 5 and 7 and an increment may correspond to any new interval entry in Tables 4, 5 and 7. It should be noted that the second pre-determined set of increments can be the same pre-determined set of increments employed in method 1400.

At step 1506, the control unit 502 can transmit, to at least one base station in each in-neighbor sector, a corresponding indication of the utility change for each increment of the second pre-determined set of increments. For example, the control unit 502, using transmitter 504, can transmit to each in-neighbor in the set of in-neighbors a set of corresponding utility changes for each different interval in any one of Tables 4, 5 and 7 by which the native set or PRU interval of the in-neighbor can be adjusted. In other words, to any given in-neighbor, if Table 4 is employed as a pre-determined set of increments, four utility changes are provided to the given in-neighbor corresponding to the four intervals to which the given in-neighbor can be adjusted. It should be understood that the transmission at step 1504 can correspond to the receiving step 1406 of method 1400 performed by a base station disposed in an in-neighbor of the given sector. Further, the transmitting step may itself be an indication to an in-neighbor that the given sector is an out-neighbor of the in-neighbor. Alternatively, once the set of in-neighbors is compiled by the given base station, a separate message may be transmitted by the control unit 1502 via the transmitter 504 to each in-neighbor to inform the in-neighbors that the given sector is an out-neighbor.

At step 1508, the control unit 502 may receive, via receiver 506, an indication of an adjusted native set or PRU interval from each in-neighbor of the given sector. Step 1508 may, for example, correspond to transmitting steps 1412 of method 1400 performed by base stations disposed in the in-neighbors of the given sector. Accordingly, the control unit 502 may receive boundaries of an adjusted native set or PRU interval, as indicated in any of Tables 4, 5 and 7, from each in-neighbor sector. The native set or PRU interval data may be useful for computation of utility changes in subsequent iterations of method 1500.

Thereafter, method 1500 may be iterated for each of a predetermined period. For example, as indicated above, the period may correspond to K super-frames.

It should be understood that any of the exemplary restrictions discussed above with respect to native set or PRU interval updates can be implemented within methods 1400 and 1500. For example, to reduce complexity of message exchange between base stations, any one or more of the following restrictions may apply: 1) each sector is allocated with a consecutive set of PRUs; 2) each sector is constrained to have at least one PRU from its initial native set at all times; and 3) during each update, the interval length changes by at most two PRUs in each iteration: it either increases or decreases the lower bound and/or upper bound of the interval by at most one.

It should also be understood in either one or both of methods 1400 and 1500, the method steps recited therein can be additionally performed with respect to a second contiguous, native set of PRUs, dedicated for transmission of data to users in the given sector, that is separated from the first native set along the contiguous frequency band. For example, the second native set may correspond to any one of the secondary sets 1304, 1308 and 1312 of FIG. 13 while the first native set may respectively correspond to any one of the primary sets 1302, 1306 and 1312, of FIG. 13. Accordingly, methods 1400 and 1500 can include separate and independent application of the method steps recited therein to the first native set of contiguous PRUs and the second native set of contiguous PRUs for the given sector, as discussed above. Furthermore, use of the first native set and second native set can result in overlapping of any of the native sets of the given sector with a native sector of every other sector in a given cell in which the given sector is disposed to effectively generate a 1/1 reuse partition at the overlap at each iteration, as discussed above. Moreover, as noted above, methods 1400 and 1500 can be performed simultaneously by every base station, or a subset of base stations, of every sector of a given cell. Similarly, methods 1400 and 1500 can be performed simultaneously by every base station, or a subset of base stations, of every cell, or a subset of cells, of a cellular network.

It should also be noted that the methods and systems discussed above can be applied to either or both downlink and uplink transmission, as understood by those of ordinary skill in the art.

Having described preferred embodiments of systems and methods (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A fractional frequency reuse method for assigning physical resource units of a contiguous frequency band to a given sector of a cell including at least one base station comprising:
   allocating an initial contiguous, native set of the physical resource units dedicated for transmission of data to users in the given sector;
   from at least one base station in each out-neighbor sector, receiving an indication of a utility change due to adjustment of the size of the native set for each increment of a pre-determined set of increments, wherein an out-neighbor sector is a sector that is subjected to interference from the given sector that exceeds an interference threshold;
   computing a total utility change for each of the increments based on utility changes of the out-neighbor sectors and selecting one of the increments for adjusting the size of the native set based on the total utility change; and transmitting the data to the users in the given sector on the native set of the physical resource units adjusted in accordance with the selected increment.

2. The method of claim 1, further comprising:
compiling a set of in-neighbor sectors for the given sector, wherein an in-neighbor sector subjects the given sector to interference that exceeds a second interference threshold and wherein each in-neighbor sector is allocated a contiguous, in-neighbor native set of the physical resource units dedicated for transmission of data to users in the in-neighbor sector;
for each in-neighbor sector, computing a utility change in the given sector due to adjustment of the size of the in-neighbor native set for each increment of a second pre-determined set of increments; and
transmitting, to at least one base station in each in-neighbor sector, a corresponding indication of the utility change for each increment of the second pre-determined set of increments.

3. The method of claim 1, wherein the selecting further comprises selecting the increment corresponding to the highest total utility with a given probability.

4. The method of claim 1, wherein the selecting further comprises
determining, for the given sector, the highest total utility achievable based on the total utility changes;
transmitting an indication of a total utility increase corresponding to the highest total utility to at least one base station in each interfering neighbor, wherein an interfering neighbor is at least one of: a sector that has at least one common out-neighbor sector with the given sector, a sector that is an out-neighbor sector of the given sector or a sector that subjects the given sector to interference that exceeds a second interference threshold;
receiving corresponding highest total utilities from at least one base station in each interfering neighbor; and
selecting the increment corresponding to the highest total utility for adjusting the size of the native set of the given sector if the total utility increase for the given sector is the maximum total utility increase with respect to the total utility increases of interfering neighbors.

5. The method of claim 1, wherein the native set of the physical resource units is a first native set of the physical resource units and wherein the allocating, receiving, computing and transmitting is additionally performed with respect to a second contiguous, native set of the physical resource units, dedicated for transmission of data to users in the given sector, that is separated from the first native set along the contiguous frequency band.

6. The method of claim 5, wherein the receiving, computing and transmitting is iterated and wherein at least one of the native sets of the given sector overlaps, along the contiguous frequency band, with a contiguous, native set of physical resource units of every other sector of the cell at each iteration.

7. The method of claim 1, wherein the receiving, computing and transmitting is iterated and wherein the native set is constrained to have at least one physical resource unit that was included in the initial native set of physical resource units.

8. The method of claim 7, wherein the adjusting is constrained such that the native set is adjusted by at most two physical resource units at each iteration.

9. The method of claim 1, further comprising:
deboosting transmit power over other physical resource units along the contiguous frequency band that are outside the native set for transmission of data to users in the given sector on the other physical resource units.

\* \* \* \* \*